(12) United States Patent
Mineno

(10) Patent No.: US 9,460,084 B2
(45) Date of Patent: *Oct. 4, 2016

(54) COMPARISON OF CHARACTER STRINGS

(71) Applicant: FUJITSU LIMITED, Kawasaki-shi, Kanagawa (JP)

(72) Inventor: Kazuo Mineno, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/690,578

(22) Filed: Apr. 20, 2015

(65) Prior Publication Data
US 2015/0227506 A1 Aug. 13, 2015

Related U.S. Application Data

(63) Continuation of application No. 13/219,817, filed on Aug. 29, 2011, now Pat. No. 9,037,593.

(30) Foreign Application Priority Data

Sep. 29, 2010 (JP) ................. 2010-219878

(51) Int. Cl.
*G06F 7/00* (2006.01)
*G06F 17/30* (2006.01)
*G06F 17/27* (2006.01)

(52) U.S. Cl.
CPC ......... *G06F 17/2785* (2013.01); *G06F 17/278* (2013.01); *G06F 17/30734* (2013.01)

(58) Field of Classification Search
CPC ........... G06F 17/2785; G06F 17/2795; G06F 17/289; G06F 17/30011; G06F 17/3071; G06F 2207/025; G06F 7/02; G06F 17/271; G06F 17/274; G06F 17/277; G06F 17/30663; G06F 8/425; G06F 8/427
USPC ....................................................... 707/749
See application file for complete search history.

(56) References Cited

U.S. PATENT DOCUMENTS 4,887,212 A * 12/1989 Zamora ............... G06F 17/2705 704/8
6,470,306 B1 10/2002 Pringle et al.
7,072,826 B1 7/2006 Wakita
7,991,987 B2 8/2011 Cabot
8,548,791 B2 10/2013 Itagaki et al.
9,037,593 B2 * 5/2015 Mineno ................. G06F 17/278 704/2

(Continued)

FOREIGN PATENT DOCUMENTS

JP 63-261457 10/1988
JP 03-008082 1/1991

(Continued)

OTHER PUBLICATIONS

USPTO, (PHAM) Notice of Allowance and Notice of Allowability, Jan. 22, 2015, in parent U.S. Appl. No. 13/219,817 [now allowed].

(Continued)

*Primary Examiner* — Robert Beausoliel, Jr.
*Assistant Examiner* — Michael Pham
(74) *Attorney, Agent, or Firm* — Fujitsu Patent Center

(57) ABSTRACT

A computer-readable, non-transitory medium storing a character string comparison program is provided. The program causes, when executed by a computer, the computer to perform a process including splitting a first character string and a second character string into words; acquiring information including a semantic attribute that represents a semantic nature of each of the words and a conceptual code that semantically indentifies said each of the words, from a storage device; identifying a pair of the words having a common semantic attribute between the first character string and the second character string; comparing the conceptual codes of the specified pair of the words between the first character string and the second character string; and generating a comparison result between the first character string and the second character string based upon a comparison result of the conceptual codes.

9 Claims, 27 Drawing Sheets

(56) References Cited

U.S. PATENT DOCUMENTS

| | | | |
|---|---|---|---|
| 2005/0028143 A1* | 2/2005 | Aridor | G06F 8/71 717/122 |
| 2006/0217954 A1 | 9/2006 | Koyama et al. | |
| 2011/0106821 A1 | 5/2011 | Hassanzadeh et al. | |

FOREIGN PATENT DOCUMENTS

| | | |
|---|---|---|
| JP | 2866944 | 3/1999 |
| JP | 2000-305930 | 11/2000 |
| JP | 2003-058537 | 2/2003 |
| JP | 2003-167898 | 6/2003 |

OTHER PUBLICATIONS

USPTO, (PHAM) Advisory Action, Dec. 22, 2014, in parent U.S. Appl. No. 13/219,817 [now allowed].

USPTO, (PHAM) Final Office Action, Aug. 5, 2014, in parent U.S. Appl. No. 13/219,817 [now allowed].

USPTO, (PHAM) Non-Final Office Action, Feb. 20, 2014, in parent U.S. Appl. No. 13/219,817 [now allowed].

* cited by examiner

FIG.2

```
<name-identification_process_definition>
    <name-identification_method>name-identification against others</name-identification_method>
    <name-identification_source>
        <access_information>name-identification source data</access_information>
        <record_format>
            <name>ID</name>
            <name>full_name</name>
            <name>address</name>
            <name>office</name>
        </record_format>
    </name-identification_source>
    <name-identification_target>
        <access_information>name-identification target data</access_information>
        <record_format>
            <name>ID</name>
            <name>full_name</name>
            <name>address</name>
            <name>office</name>
        </record_format>
    </name-identification_target>
    <name-identification_item>
        <source-target>full_name:full_name</source-target>
        <evaluation_function>conceptual_evaluation_personal_name</evaluation_function>
        <weight>0.4</weight>
    </name-identification_item>
    <name-identification_item>
        <source-target>address:address</source-target>
        <evaluation_function>conceptual_evaluation_address</evaluation_function>
        <weight>0.3</weight>
    </name-identification_item>
    <name-identification_item>
        <source-target>office:office</source-target>
        <evaluation_function>conceptual_evaluation_company</evaluation_function>
        <weight>0.3</weight>
    </name-identification_item>
    <threshold_value>
        <upper_level>0.72</upper_level>
        <lower_level>0.26</lower_level>
    </threshold_value>
</name-identification_process_definition>
```

FIG.4

| | NOTATION | WORD CLASS | CONCEPTUAL CODE | SEMANTIC ATTRIBUTE | FREQUENCY |
|---|---|---|---|---|---|
| 1 | Fujitsu | NOUN | FUJITSU | Company Name, Followed by "Limited" | 100 |
| 2 | Limited | NOUN | LIMITED | Legal Personality | 200 |
| 3 | Shin-Yokohama Building | NOUN | SY_Buil | Building Name | 50 |
| 4 | SY | NOUN | SY_Buil | Abbreviation, Building name | 50 |
| 5 | Middleware Division | NOUN | MW | Organization Name, Division | 50 |
| 6 | Data Management Middleware Department | NOUN | DMM | Organization Name, Department | 100 |
| 7 | DMM | NOUN | DMM | Organization Name, Department | 20 |
| 8 | ) | SYMBOL | ) | Separator | 10 |
| 9 | | SYMBOL | SPACE | Separator | 10 |
| 10 | 3 | NUMERAL | 3 | Digit | 10 |
| 11 | 2 | NUMERAL | 2 | Digit | 10 |
| 12 | -th | ADJECTIVE | NO | Numerical Order | 10 |
| 13 | Development | NOUN | Develop | Organization Name, Group | 10 |
| 14 | Department | NOUN | bu | Organizational Unit, Group | 10 |

FIG.5

INPUT CHARACTER STRING

FIJITSU SY DMM)3 DEVELOPMENT

⇩ MORPHOLOGICAL ANALYSIS

MORPHOLOGICAL ANALYSIS RESULT (WORD LIST)

| NOTATION | CONCEPTUAL CODE | SEMANTIC ATTRIBUTE |
|---|---|---|
| Fujitsu | FUJITSU | Company Name, Followed by "Limited" |
| SY | SY_Buil | Abbreviation, Building name |
| | SPACE | Separator |
| DMM | DMM | Organization Name, Department |
| ) | ) | Separator |
| 3 | 3 | Digit |
| Development | Develop | Organization Name, Group |

FIG.6

| | AFFIRMATIVE CONDITION | NEGATIVE CONDITION | RULE |
|---|---|---|---|
| ⟨1⟩ | [COMPANY NAME] | | =⟨COMMON⟩ |
| ⟨2⟩ | [COMPANY NAME] [LEGAL PERSONALITY] | [ANTECEDED BY "Limited"] | [COMPANY NAME] =[COMPANY NAME]+[LEGAL PERSONALITY] |
| ⟨3⟩ | [COMPANY NAME] [BUILDING NAME] | | [COMPANY NAME]-⟨BUSINESS OFFICE⟩ -[BUILDING NAME] |
| ⟨4⟩ | [COMPANY NAME] [ORGANIZATION NAME] | | [COMPANY NAME]-⟨BUSINESS SEGMENT⟩ -[ORGANIZATION NAME] |
| ⟨5⟩ | [ORGANIZATION NAME] [SEPARATOR] | | [ORGANIZATION NAME] =[ORGANIZATION NAME]+[SEPARATOR] |
| ⟨6⟩ | [DIGIT] [ORGANIZATION NAME] | | [ORGANIZATION NAME] =[DIGIT]+[ORGANIZATION NAME] @ CONCEPTUAL CODE CONNECTION |

⟨1⟩ ⟨COMMON⟩–[$COMPANY NAME]
⟨2⟩ [$COMPANY NAME]–⟨BUSINESS OFFICE⟩–[$BUSINESS OFFICE NAME]
⟨3⟩ [$COMPANY NAME]–⟨BUSINESS SEGMENT⟩–[$DEPARTMENT]
⟨4⟩ [$DEPARTMENT]–⟨BUSINESS SEGMENT⟩–[$GROUP]

FIG.10

| | AFFIRMATIVE CONDITION | NEGATIVE CONDITION | RULE |
|---|---|---|---|
| ⟨1⟩ | [*]–⟨BUSINESS OFFICE⟩–[$BUILDING NAME] | | [*]–⟨BUSINESS OFFICE⟩ –[$BUSINESS OFFICE NAME] |
| ⟨2⟩ | [*]–⟨BUSINESS SEGMENT⟩–[$DEPARTMENT]; [*]–⟨BUSINESS SEGMENT⟩–[$GROUP]; | | [*]–⟨BUSINESS SEGMENT⟩ –[$DEPARTMENT]; [$DEPARTMENT]–⟨BUSINESS SEGMENT⟩ –[$GROUP]; |

FIG.12A

| ELEMENT | WEIGHT |
|---|---|
| COMPANY NAME | 0.6 |
| DEPARTMENT | 0.2 |
| GROUP | 0.1 |
| BUSINESS OFFICE NAME | 0.1 |

FIG.12B

| ITEM | WEIGHT |
|---|---|
| FULL NAME | 0.5 |
| ADDRESS | 0.3 |
| OFFICE | 0.2 |

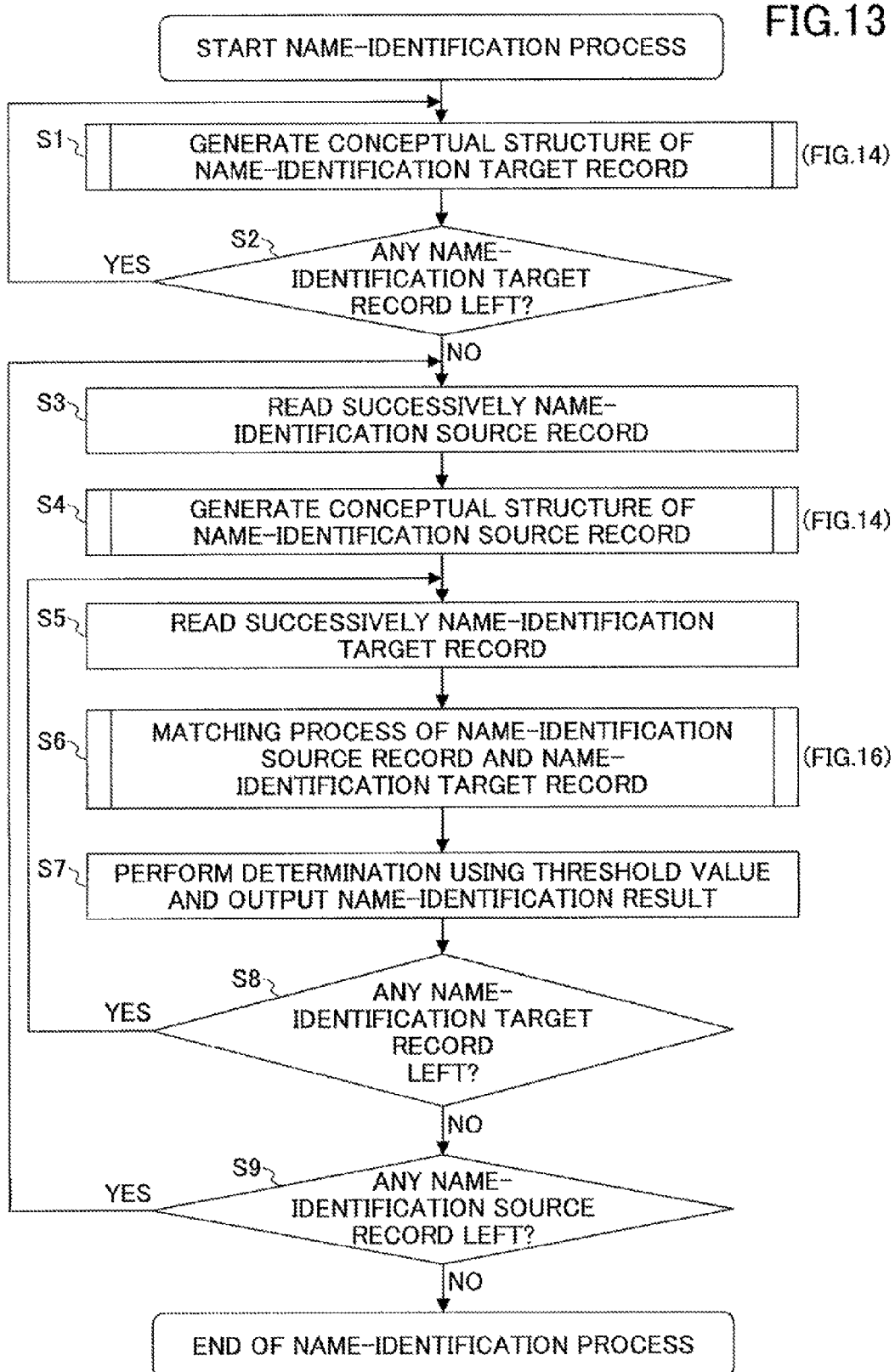

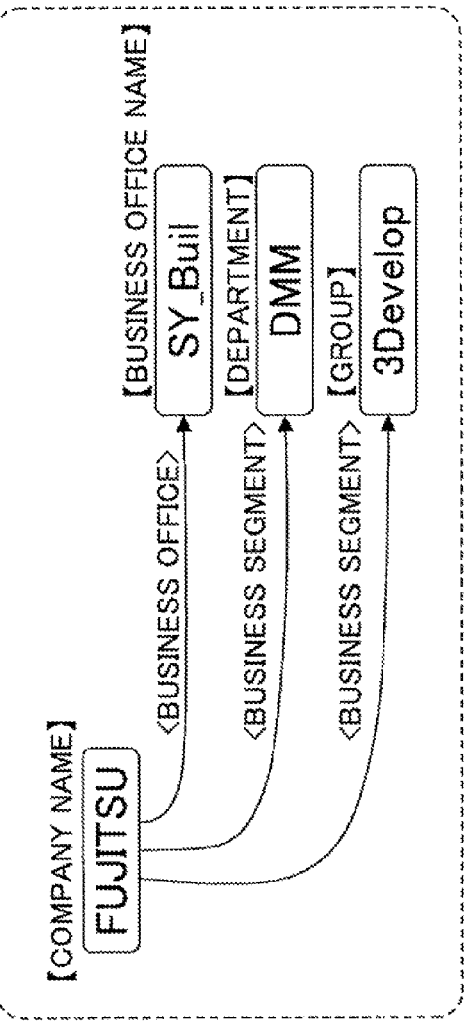

⟨1⟩ ⟨COMMON⟩~[FUJITSU $COMPANY NAME]
⟨2⟩ [FUJITSU $COMPANY NAME]~⟨BUSINESS OFFICE⟩~[SY_Buil $BUSINESS OFFICE NAME]
⟨3⟩ [FUJITSU $COMPANY NAME]~⟨BUSINESS SEGMENT⟩~[DMM $DEPARTMENT]
⟨4⟩ [DMM $DEPARTMENT]~⟨BUSINESS SEGMENT⟩~[3Develop $GROUP]

⟨1⟩ ⟨COMMON⟩–[FUJITSU $COMPANY NAME]
⟨2⟩ [FUJITSU $COMPANY NAME]–⟨BUSINESS OFFICE⟩–[SY_Buil $BUSINESS OFFICE NAME]
⟨3⟩ [FUJITSU $COMPANY NAME]–⟨BUSINESS SEGMENT⟩–[DMM $DEPARTMENT]
⟨4⟩ [DMM $DEPARTMENT]–⟨BUSINESS SEGMENT⟩–[2Develop $GROUP]

FIG.21

| ELEMENT | ELEMENT WEIGHTING FACTOR | COMPARISON VALUE | WEIGHTED COMPARISON VALUE | EVALUATION VALUE |
|---|---|---|---|---|
| COMPANY NAME | 0.6 | 1.0 | 0.6 | 0.9 |
| DEPARTMENT | 0.2 | 1.0 | 0.2 | |
| GROUP | 0.1 | 0 | 0 | |
| BUSINESS OFFICE NAME | 0.1 | 1.0 | 0.1 | |

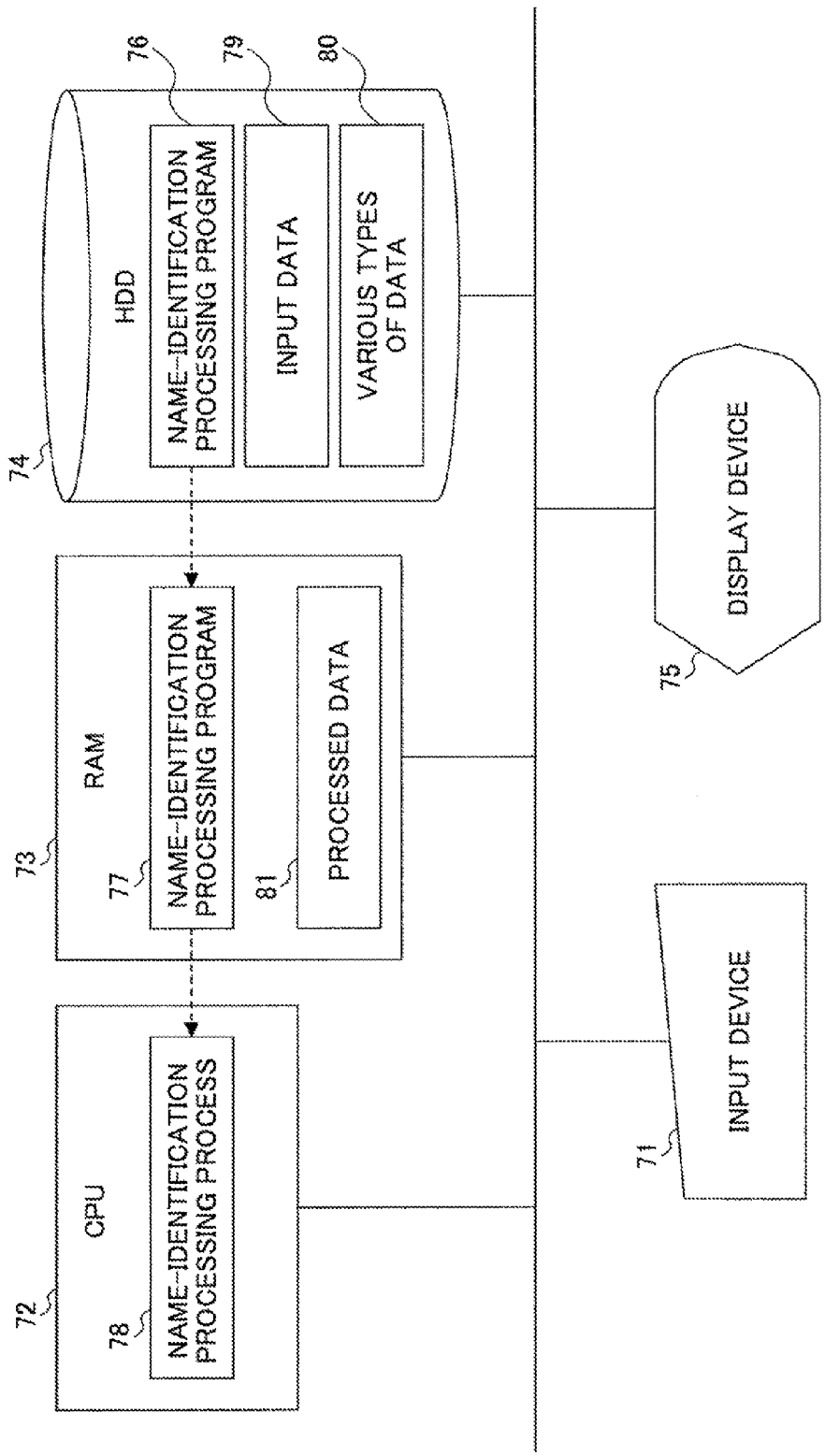

COMPARISON OF CHARACTER STRINGS

CROSS REFERENCE TO RELATED APPLICATIONS

This application is a continuation application of U.S. application Ser. No. 13/219,817 filed Aug. 29, 2011, which is based upon and claims the benefit of priority of the prior Japanese Patent Application No. 2010-219878, filed on Sep. 29, 2010, the entire contents of which are incorporated herein by references.

FIELD

The present disclosures relate to a technique for performing comparison of character strings on a machine.

BACKGROUND

Techniques for performing morphological analysis on character strings to split them into individual words for carrying out syntactic parsing based upon the word classes of the respective words have been proposed. The analysis result is used in various procedures. For example, when translating a document, morphological analysis and syntactic parsing are applied to character strings contained in the document to identify the modification relationships between words in the character strings. A technique for creating a syntactic tree after identification of the modification relationships between words in retrieved character strings is also known. With this technique, the syntactic tree is used in data retrieval. Still another known technique is to store various concepts that make up a document, together with newsworthiness of the concepts, in a knowledge database. In this case, an evaluation value is calculated based upon the newsworthiness of the concepts and adequacy of an input document with respect to slots of the concept structure. This technique is used to create an abstract of the input document based upon the concepts with higher evaluation values. Yet another know technique is to create syntactic tree data and partial tree data from an input document and convert the data into tuple data representing two mutually related phrases and the relationship between the phrases. The tuple data are used, for example, for aggregate calculation of frequency data. Yet another known technique is, in language translation, to split a pair of sentences of the original language and the target language into words and produce a pair of sentences expressed by word classes to extract a phrase defining a semantic block by coupling the most frequent words and word classes.

When performing a character string comparison process, conventional techniques employ nothing more than simple comparison between notations of character strings. With such comparison, character strings with different notations are determined to be different character strings even if these character strings have substantially the same semantic content. Even if morphological analysis and syntactic parsing are performed prior to the comparison, the morphological analysis result and accordingly, the comparison result exhibits determination of different character strings as long as the notations of the character strings are different because the conventional syntactic parsing does not reflect the semantic contents of individual words. Thus, it is difficult for the conventional techniques to determine if two character strings are consistent with each other taking the semantic contents into account.

Patent Document 1: Japanese Laid-open Patent Publication No. H3-8082A
Patent Document 2: Japanese Laid-open Patent Publication No. 2003-167898A
Patent Document 3: Japanese Laid-open Patent Publication No. 563-261457A
Patent Document 4: Japanese Laid-open Patent Publication No. 2003-58537A
Patent Document 5: Japanese Laid-open Patent Publication No. 2000-305930A

SUMMARY

According to one aspect of the embodiment, a computer-readable, non-transitory medium storing a program which, when executed by a computer, causes the computer to perform a process is provided. The process executed by the computer includes:

splitting a first character string and a second character string into words;

acquiring information including a semantic attribute that represents a semantic nature of each of the words and a conceptual code that semantically identifies said each of the words, from a storage device;

generating a first conceptual structure based upon the semantic attribute of each of the words included in the first character string and a grammatical configuration;

generating a second conceptual structure based upon the semantic attribute of each of the words included in the second character string and the grammatical configuration; and generating a comparison result between the first character string and the second character string based upon a comparison result between the first conceptual structure and the second conceptual structure.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 illustrates an example of a definition of a name-identification process;

FIG. 4 is an explanatory diagram of a terminology dictionary;

FIG. 5 is an explanatory diagram of a morphological analysis result;

FIG. 6 is an explanatory diagram of analytical grammar;

FIG. 10 is an explanatory diagram of a normalization rule;

FIG. 12A illustrates an example of element weighting information;

FIG. 12B illustrates an example of item weighting information;

FIG. 13 is a flowchart illustrating an overall process of name identification;

FIG. 18A is an explanatory diagram of a name-identification target conceptual structure (in the middle of normalization);

FIG. 18B is a schematic diagram of the name-identification target conceptual structure of FIG. 18A;

FIG. 21 is an explanatory diagram of calculation of an evaluation value;

FIG. 27 illustrates an example of the hardware structure of a name identification apparatus.

DESCRIPTION OF EMBODIMENTS

The embodiments realize a character string comparison process taking into account the semantic contents of the character strings under the comparison. In one example, a first character string and a second character string to be compared are respectively split into individual words, and information including a semantic attribute that represents a semantic nature of each of the words and a conceptual code that semantically identifies each of the words is acquired from a storage device or a memory. Based upon the acquired information, a pair of words having a common semantic attribute between the first character string and the second character string is identified. Then, the conceptual codes corresponding to said pair of words having the common semantic attribute are compared to each other. Based upon the comparison result of the conceptual codes, a comparison result between the first character string and the second character string is generated.

With this arrangement, comparison between the first and second character strings is made based upon the conceptual code comparison result.

Description is now made of actual examples of comparison of character strings based mainly upon the semantic contents of the character strings, rather than simple comparison between the notations of the character strings. According to the character string comparison process described below, when the semantic contents of two character strings under mutual comparison are substantially the same, a comparison result representing agreement of the two character strings is created even if the notations are different.

[a] First Embodiment

In the first embodiment, the above-described character string comparison is applied to a name identification process for determining whether records containing multiple items agree with each other. In this specification, the term "agree with" means not only perfect matching but also a certain degree of similarity between items under comparison. The name identification process may be used to detect a data item relevant to name-identification source data, from among name-identification target data. To be more precise, one record and another record contained in the same database are compared in the name identification process, and if two records under the comparison agree with each other, one of the overlapped records is deleted. Another application is comparison between a record in one database and a record in another database in the name identification process. In this case, if there is relevancy between the records (for example, having the same or similar value in a key item), these records are associated with each other.

Figure 1:
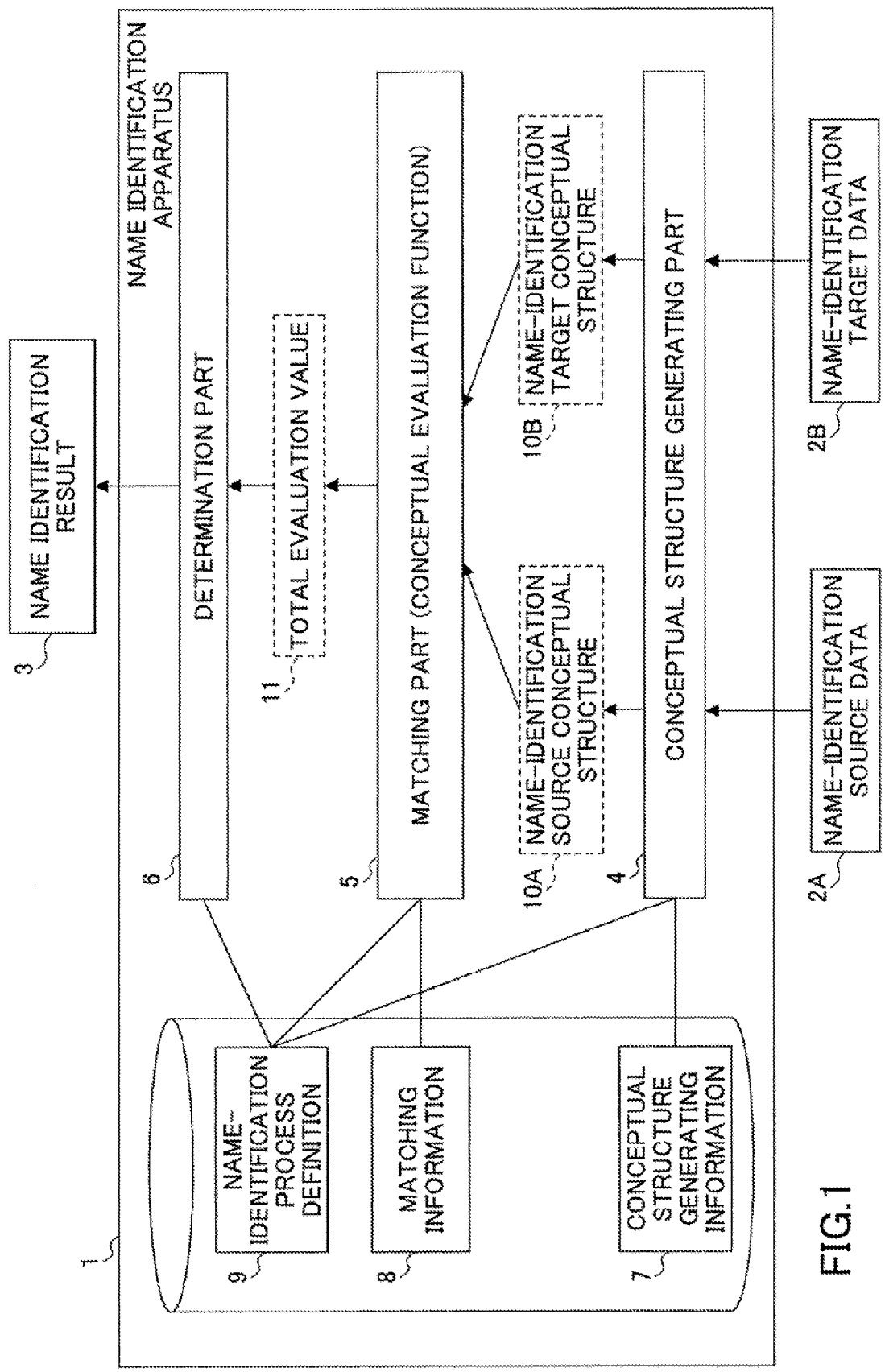
FIG. 1 illustrates an overall structure of a system for realizing name-identification processing.

FIG. 1 illustrates an overall structure of a system for realizing a name identification process. In this system, a name identification apparatus 1 compares a name-identification source record included in name-identification source data 2A to a name-identification target record included in name-identification target data 2B to determine if two records agree with each other, and outputs the determination result as a name identification result 3. The name-identification source data 2A and the name-identification target data 2B are stored in a data storage device such as a hard disk drive or a flash memory. The name identification result 3 may be output as an electronic file to the data storage device, or displayed on a screen panel of a display device, or alternatively, it may be output as a report form. The data storage device for storing the name-identification source data 2A, the name-identification target data 2B, and the name identification result 3 may be either an internal storage provided in the name identification apparatus 1, or an external storage.

The name identification apparatus 1 includes a conceptual structure generating part 4, a matching part 5, and a determination part 6, which parts execute a name identification process. The name identification apparatus 1 has conceptual structure generating information 7, matching information 8, and a name-identification process definition 9 stored in the data storage device (storage means) such as a hard disk drive.

The conceptual structure generating part 4 generates a name-identification source conceptual structure 10A for the character string of each item contained in the name-identification source record, and generates a name-identification target conceptual structure 10B for the character string of each item contained in the name-identification target data 2B. The conceptual structure will be described in more detail below in conjunction with explanation of the conceptual structure generating part 4.

The matching part 5 compares values (character strings) of corresponding items between a name-identification source record and a name-identification target record, using the conceptual structure generated by the conceptual structure generating part 4, and calculates a total evaluation value 11 summing up the comparison results of the respective items of the character strings.

The determination part 6 outputs a name identification result 3, which result represents either matching (White), nonmatching (Black), or non-available (Gray) as to whether the name-identification source record and the name-identification target record agree with each other.

The conceptual structure generating information 7 includes information used by the conceptual structure generating part 4 to generate a conceptual structure. Actual examples of the conceptual structure generating information 7 will be described below in conjunction with the explanation on the conceptual structure generating part 4.

The matching information 8 includes data used by the matching part 5 to carry out the matching process. Actual examples of the matching information 8 will be described below in conjunction with the explanation on the matching part 5.

The name-identification process definition 9 includes, for example, information for identifying the name-identification source data 2A and the name-identification target data 2B, items to be subjected to the name-identification process, evaluation functions applied to the respective items and weighting values for the evaluation results, and threshold values as determination criteria used in the determination part 6 to determine whether two records agree with each other, as illustrated in FIG. 2. An evaluation function using a conceptual structure (a conceptual evaluation function) can be selected by designating "conceptual_evaluation_XX". In this specification, explanation is made of an example in which the conceptual evaluation function is designated as the evaluation function.

When a conceptual evaluation function is designated for the evaluation function to be applied to a pair of items in the name-identification process definition 9, the semantic domain to be treated by the designated conceptual evaluation function is defined, and then analytical grammar 16 (FIG. 3), a standard conceptual structure 17 and a normalization rule 18 corresponding to the semantic domain are determined. The subsequent procedures are carried out using the determined combination.

For example, in the name-identification process definition illustrated in FIG. 2, the items to be subjected to name-identification designated by the first <name-identification_item> tag are a pair of a "name" item of the "name-identification source data" and a "name" item of the "name-identification target data". The corresponding evaluation function is "conceptual_evaluation_personal_name", and the weighting factor for the evaluation result is "0.4". Since "conceptual_evaluation_personal_name" is designated as the evaluation function to be applied to the processed items, the semantic domain treated by this evaluation function is "personal name". Accordingly, the analytical grammar 16, the standard conceptual structure 17, and the normalization rule 18 that correspond to the "personal name" domain are used.

In this example, the items under the name identification process are compared between the name-identification source record and the name-identification target record. The character strings contained in the items under the comparison have a common semantic domain (nature), which domain is supposed to be consistent with the semantic domain treated by the designated conceptual evaluation function.

In the specification, a "semantic domain" is a domain expressed by individual character strings to be processed. In general, items (or columns) in a table in a relational database (RDB) are structured as an aggregate of character strings having specific semantic domains as typically represented by the item names. Elements in extensible markup languages (XML) are also structured so as to have character strings having specific semantic domains typically represented by the element names, such character strings being treated as values or attributes. For instance, if the semantic domain of the item "name" in the RDB is "personal name", then the item "name" of each record has a character string representing a name of a person, such as "Ichiro Tanaka" or "Jiro Suzuki" belonging semantically to the "personal name" domain, and such a character string is treated as a value. In another example, if the semantic domain of <name> element, which is a subelement of <member> element of XML, indicates a "member's name", then the <name> element (i.e., a subelement of <member> element) has a value of the character string such as "Ichiro Tanaka" or "Jiro Suzuki" belonging semantically to the "personal name" domain.

The name-identification source conceptual structure 10A, the name-identification target conceptual structure 10B, and the total evaluation value 11 may be temporarily stored in a random access memory (RAM), or it may be stored in a hard disk drive.

Next, explanation is made of the structure of the conceptual structure generating part 4.

Figure 3:
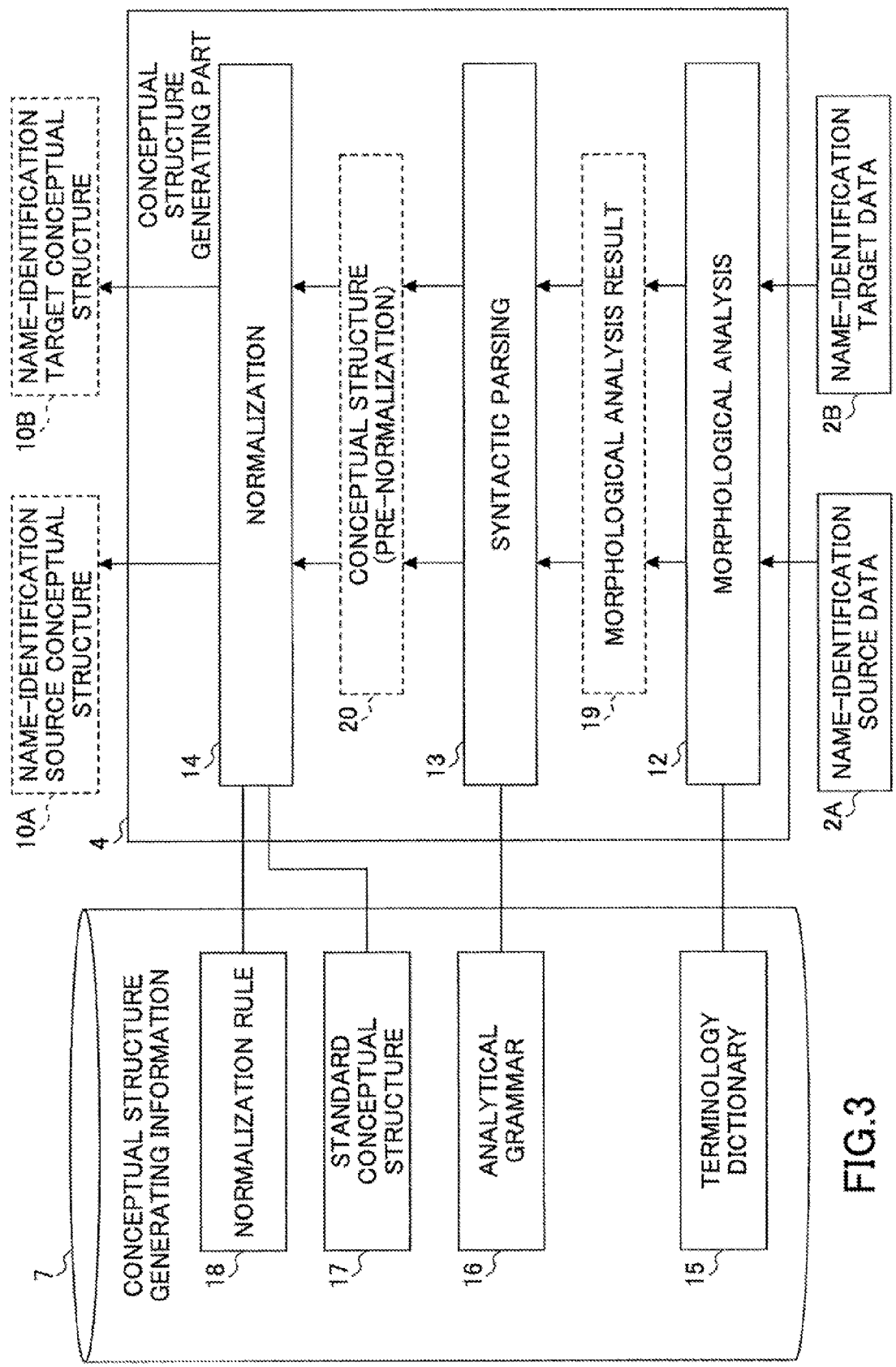
FIG. 3 illustrates an exemplary structure of the conceptual structure generating part.

FIG. 3 illustrates a structure of the conceptual structure generating part 4. The conceptual structure generating part 4 includes a morphological analysis part 12, a syntactic parsing part 13, and a normalization part 14. The conceptual structure generating part 4 carries out the process in reference to the terminology dictionary 15, the analytical grammar 16, the standard conceptual structure 17 and the normalization rule 18 stored in the data storage device of the name identification apparatus 1.

The morphological analysis part 12 carries out morphological analysis on the character strings of the respective items to be compared using the conceptual structure between the records in the name-identification source data 2A and the name-identification target data 2B. To be more precise, the morphological analysis part 12 checks the character string from the beginning with reference to the terminology dictionary 15 to split the character string into individual words provided in the terminological dictionary 15.

FIG. 4 illustrates an example of the terminological dictionary 15. The terminological dictionary 15 includes a notation field indicating each word contained in the character string, a word class (part of speech) field indicating the word class of the word, a conceptual code field indicating a conceptual code of the word, a semantic attribute field indicting the semantic attribute of the word, and a frequency field indicating a level of importance (or likelihood of occurrence).

In this specification, a "conceptual code" is a code for identifying a concept or a general idea of a word in the real world from the semantic viewpoint (or at a conceptual level). A word has one conceptual code. For example, the word "Fujitsu" in FIG. 4 has a conceptual code "FUJITSU" which is a distinction from other companies.

In this specification, a "semantic attribute" is an attribute expressing the meaning of a word, and one word may have multiple semantic attributes. For example, let's assume two character strings, "a company in the Fuji area" and "a company Fuji Michio is working for". The word "Fuji" in the former character string has a "regional name" as the grammatical attribute, and this character string means "a company located in an area named Fuji". The word "Fuji" in the latter character string has a "family name" as the grammatical attribute, and this character string means "a company to which Mr. Fuji belongs". In this manner, there are a number of words having the same notation but with different semantic attributes, and therefore, it is proper to distinguish them from each other. The word "Fujitsu" in FIG. 4 has two semantic attributes, "Company Name" and "Followed by 'Limited'". The word "Middleware Division" has two semantic attributes, "Organization Name" and "Division".

The morphological analysis part 12 may perform adjacency check as appropriate based upon the word class information to determine whether words can lie next to each other. If there are competing words in the character string (with multiple possible ways of splitting the character string), the morphological analysis part 12 calculates a priority based upon the occurrence rates or the word classes of the candidate words to determine how to split the character string. If the splitting process fails in the middle, another option of the immediately last process may be tried.

The morphological analysis part 12 acquires the semantic attributes and the conceptual codes for the respective words in the character string with reference to the terminology dictionary 15 to generate a morphological analysis result (a word list) 19. FIG. 5 illustrates an example of the morphological analysis result 19. The morphological analysis result 19 holds a semantic attribute and a conceptual code acquired from the terminology dictionary 15 word by word. This morphological analysis result 19 is used in the subsequent process.

The terminology dictionary 15 may be configured to hold only those words likely to be used in a specific semantic domain treated by the conceptual evaluation function, and multiple terminology dictionaries 15, each corresponding to a certain semantic domain, may be provided. In this case, the morphological analysis part 12 selects an appropriate terminology dictionary 15 corresponding to a semantic domain treated by the conceptual evaluation function applied to the processed items under the evaluation. In this specification, explanation is made of an example in which a general-purpose terminology dictionary 15 is used.

The syntactic parsing part 13 identifies connection between words in the character string of each item, based upon the semantic attribute of each word contained in the morphological analysis result 19, with reference to the analytical grammar 16 corresponding to the semantic domain treated by the conceptual evaluation function applied to the item, and generates a conceptual structure of the character string. A conceptual structure includes conceptual codes of individual words contained as elements in the character string, which elements are associated with each other by relevancy based upon the semantic attributes of the words and/or the grammatical arrangement of the character string.

FIG. 6 illustrates an example of the analytical grammar 16. The analytical grammar 16 exits according to a semantic domain treated by a conceptual evaluation function, and it includes an affirmative condition and a negative condition serving as applied conditions, together with a corresponding rule. The affirmative condition denotes that the corresponding rule can be applied when the analysis processing state agrees with the affirmative condition. The negative condition denotes that the corresponding rule can be applied when the analysis processing state does not agree with the negative condition. If the affirmative condition and the negative condition are set, both conditions are expected to be satisfied (AND condition). The rule is a conceptual structure generation rule applied when the applied conditions are satisfied.

The analytical grammar 16 exemplified in FIG. 6 is one corresponding to the item of "OFFICE". In the explanation below, [COMPANY NAME] denotes a word whose semantic attribute is a company name. (The same applies to the other.)

<1> denotes that [COMPANY NAME] is a main axis <COMMON> of the conceptual structure.

<2> denotes that if [COMPANY NAME] and [LEGAL PERSONALITY] are consecutive, and if the semantic attribute of the word [COMPANY NAME] does not include [ANTECEDED BY "LIMITED"], then the combination of [COMPANY NAME] and [LEGAL PERSONALITY] is regarded as [COMPANY NAME].

<3> denotes that if [COMPANY NAME] and [BUILDING NAME] are consecutive, these two can be associated with each other via the concept of <BUSINESS OFFICE>. In other words, [BUILDING NAME] is a business office of [COMPANY NAME].

<4> denotes that if [COMPANY NAME] and [ORGANIZATION NAME] are consecutive, these two can be associated with each other via the concept of <BUSINESS SEGMENT>. In other words, [ORGANIZATION NAME] is a business segment of [COMPANY NAME].

<5> denotes that if [ORGANIZATION NAME] and [SEPARATOR] are consecutive, [SEPARATOR] is absorbed in [ORGANIZATION NAME].

<6> denotes that if [DIGIT] and [ORGANIZATION NAME] are consecutive, [DIGIT] is absorbed in [COMPANY NAME], and the conceptual code of [DIGIT] and the conceptual code of [ORGANIZATION NAME] are connected into a single conceptual code.

Figure 7A:
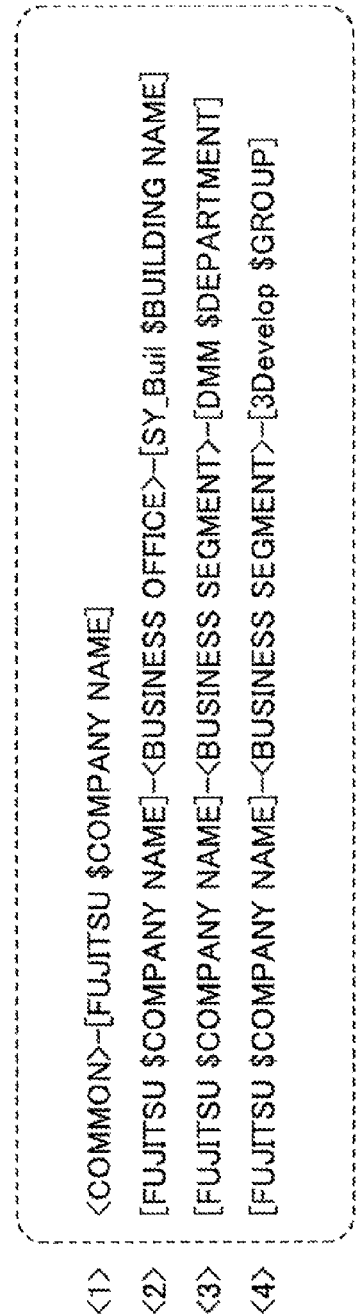
FIG. 7A is an explanatory diagram of a conceptual structure.

If the semantic attribute of a word contained in the character string satisfies the applied condition of the analytical grammar 16, the syntactic parsing part 13 repeats recursively the process for constructing the connection between words, while applying the rule of the analytical grammar 16, to generate a conceptual structure (pre-normalization) 20. The generated conceptual structure 20 is expressed as [From-node (element)]-<arc (a concept indicating connection between elements)>-[To-node (element)] in the internal structure, and forms an aggregate of directional networks. An element (From-node or To-node) of the conceptual structure corresponds to a word as a general rule, and is represented by the conceptual code of the corresponding word. The element of the conceptual structure includes information indicating the semantic attribute of the corresponding word, and the semantic attribute is expressed by symbol $ following the conceptual code. In the conceptual structure, an element that becomes the main axis (the starting point of the conceptual structure) exists, which element is designated as To-node of the <COMMON> arc that does not have a From-node. FIG. 7A is an example of the internal expression of the conceptual structure, and FIG. 7B is a schematic diagram of the conceptual structure.

Figure 7B:
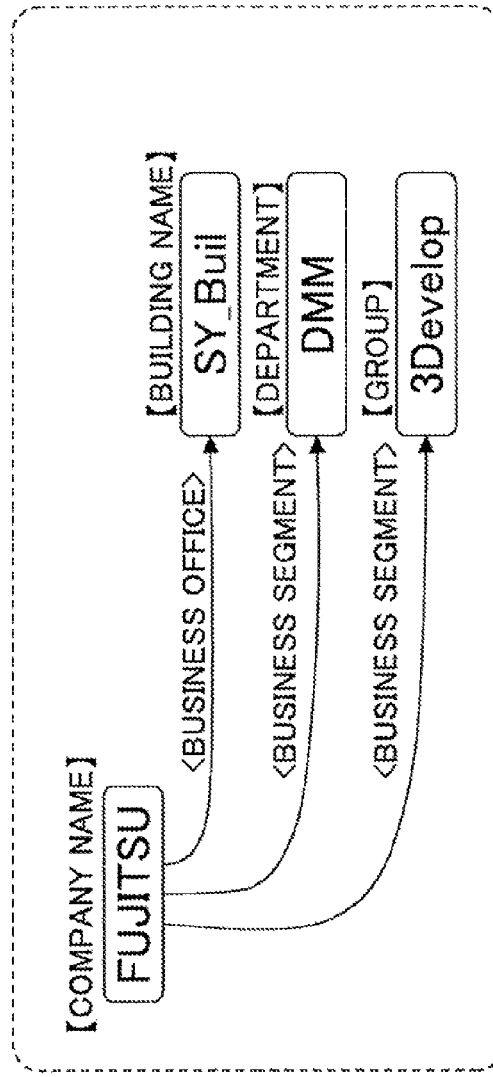
FIG. 7B is a schematic diagram of the conceptual structure of FIG. 7A.

The conceptual structure illustrated in FIG. 7A and FIG. 7B is one created for the character string of item "OFFICE". More detailed explanation is made below.

<1> denotes that [FUJITSU $COMPANY NAME] is the main axis <COMMON> of the conceptual structure.

<2> denotes that [SY_Buil $BUILDING NAME] is associated with [FUJITSU $COMPANY NAME] via the concept of <BUSINESS OFFICE>.

<3> denotes that [DMM $BUILDING NAME] is associated with [FUJITSU $COMPANY NAME] via the concept of <BUSINESS SEGMENT>.

<4> denotes that [3Develop $GROUP] is associated with [FUJITSU $COMPANY NAME] via the concept of <BUSINESS SEGMENT>.

The normalization part 14 carries out a normalization process for converting the conceptual structure 20 generated for the character string of each item to one that agrees with a prescribed standard conceptual structure 17 by consulting a database of standard conceptual structures 17, each being provided in advance as a typical conceptual structure the semantic domain of each character string is expected to have.

In this process, the normalization part 14 performs the normalization process based on the normalization rule 18 that corresponds to the standard conceptual structure 17.

Figures 8A, 8B:
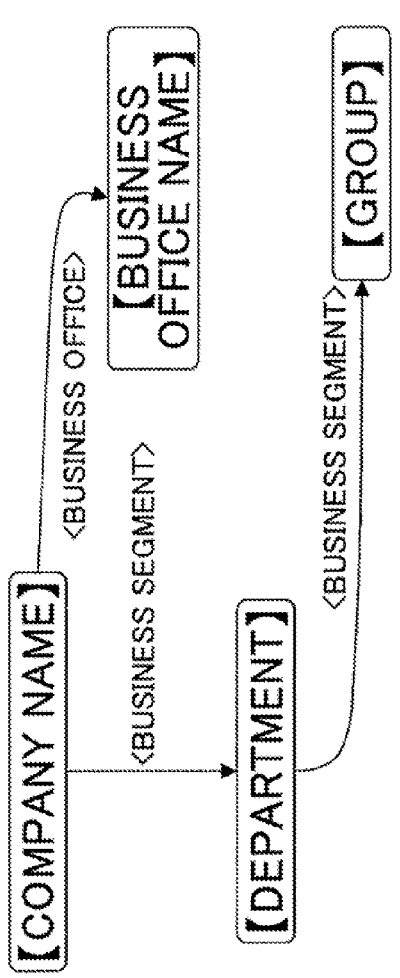
FIG. 8A is an explanatory diagram of a standard conceptual structure.
FIG. 8B is a schematic diagram of the conceptual structure of FIG. 7B.

FIG. 8A and FIG. 8B illustrates examples of the standard conceptual structure 17. The standard conceptual structure 17 is a standard form of a conceptual structure according to the semantic domain treated by the conceptual evaluation function applied to an item, and it exists according to the semantic domain of each of the conceptual evaluation functions. Since the standard conceptual structure 17 is a standard form determined separately from an actual individual conceptual structure, in the internal expression, each element has only information indicating the semantic attribute as illustrated in FIG. 8A. In the standard conceptual structure 17, each element is furnished with "$" at the beginning so as to be distinguished from the actual individual conceptual structure. FIG. 8B is a schematic diagram of the standard conceptual structure 17 of FIG. 8A.

The standard conceptual structure 17 illustrated in FIG. 8A and FIG. 8B is one provided for the item "OFFICE".

<1> denotes that [$COMPANY NAME] is the main axis <COMMON> of the conceptual structure.

<2> denotes that [$BUSINESS OFFICE NAME] is associated with [$COMPANY NAME] via the concept of <BUSINESS OFFICE>, namely, [$BUSINESS OFFICE NAME] is a business office of [$COMPANY NAME].

<3> denotes that [$DEPARTMENT] is associated with [$COMPANY NAME] via the concept of <BUSINESS SEGMENT>, namely, [$DEPARTMENT] is a business segment of [$COMPANY NAME].

<4> denotes that [$GROUP] is associated with [$DEPARTMENT] via the concept of <BUSINESS SEGMENT>, namely, [$GROUP] is a business segment of [$DEPARTMENT].

Figure 9:
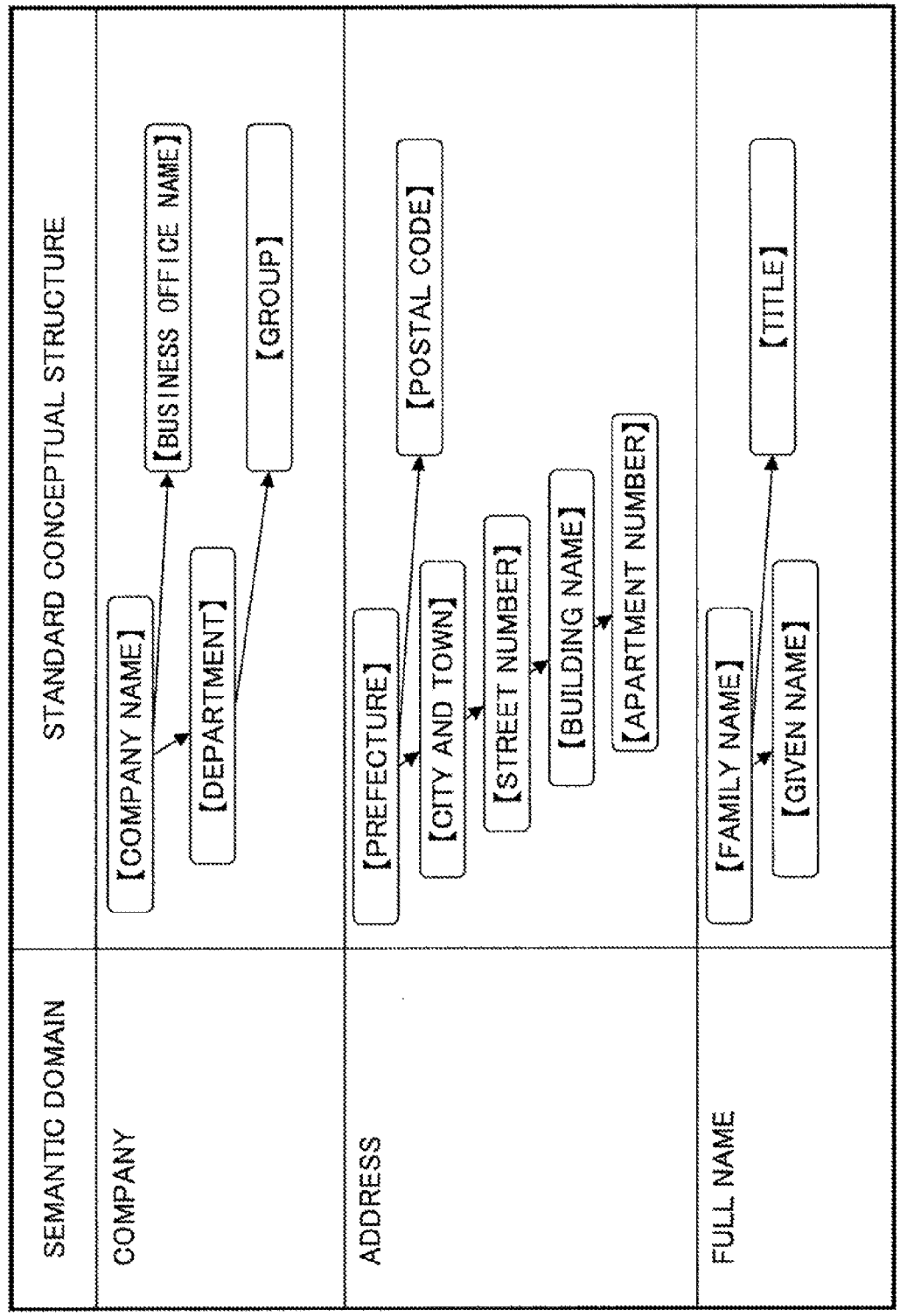
FIG. 9 is an explanatory diagram of a standard conceptual structure.

FIG. 9 illustrates standard conceptual structures 17 corresponding to multiple semantic domains, in which a "company" domain, an "address" domain, and a "full name" domain are schematized. The standard conceptual structure 17 is held for each semantic domain treated by a conceptual evaluation function.

FIG. 10 illustrates examples of the normalization rule 18. The normalization rule 18 includes an affirmative condition and a negative condition serving as applied conditions. The affirmative condition denotes that the corresponding rule can be applied when the internal expression of the conceptual structure agrees with the affirmative condition. The negative condition denotes that the corresponding rule can be applied when the internal expression of the conceptual structure does not agree with the negative condition. If the affirmative condition and the negative condition are set, both conditions are expected to be satisfied (AND condition). The normalization rule 18 includes a conversion rule applied when the applied condition is satisfied.

The normalization rule 18 illustrated in FIG. 10 is one example that is used to convert the conceptual structure of "company" domain generated from the item "OFFICE" into a standard conceptual structure 17 of the "company" domain illustrated in FIG. 9, and the particulars are explained below.

The element denoted by [*] corresponds to a conceptual code of a word having all the semantic attributes.

<1> denotes that if [BUILDING NAME] is associated with a certain element via the concept of <BUSINESS OFFICE>, the semantic attribute of [BUILDING NAME] is changed to a business office name.

<2> denotes that if [DEPARTMENT] is associated with a certain element via the concept of <BUSINESS SEGMENT> and if [GROUP] is also associated with that element via the concept of <BUSINESS SEGMENT>, then association between the word of that element and [GROUP] is cancelled and instead, [GROUP] is associated with [DEPARTMENT] via the concept <BUSINESS SEGMENT>.

The terminology dictionary 15, the analytical grammar 16, the standard conceptual structure 17, and the normalization rule 18 may be prepared in advance by a system administrator corresponding to the character strings of a comparison target and the conceptual evaluation function to be applied. The terminology dictionary 15, the analytical grammar 16, the standard conceptual structure 17 and the normalization rule 18 can be maintained in an arbitrary manner and selected according to the conceptual evaluation function to be applied.

The morphological analysis result 19, the pre-normalization conceptual structure 20, and the normalized conceptual structures, i.e., the name-identification source conceptual structure 10A and name-identification target conceptual structure 10B, may be stored temporarily in the memory, such as a RAM, or stored in the hard disk drive.

Figure 11:
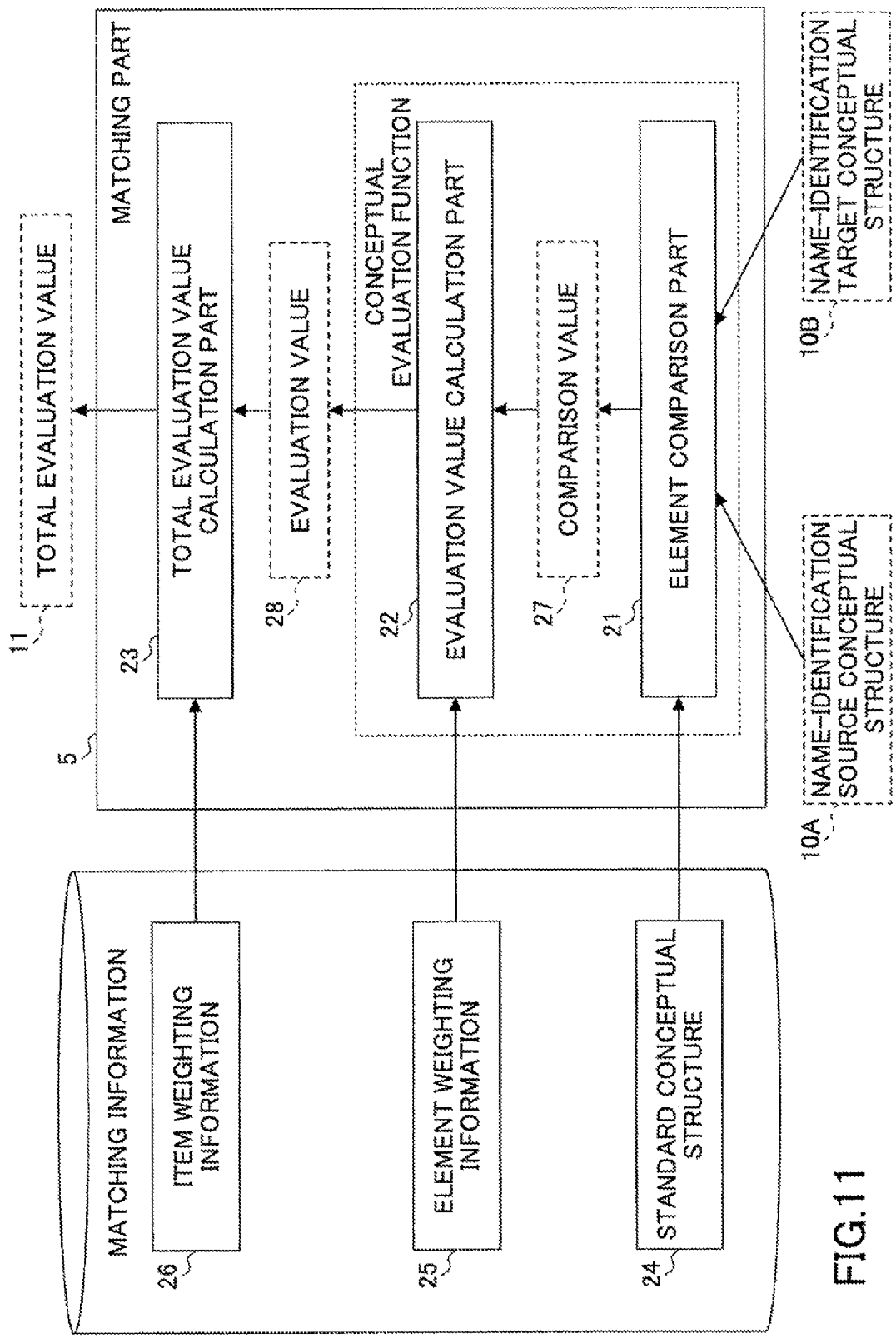
FIG. 11 illustrates an exemplary structure of the matching part.

Next, explanation is made of the matching part 5. FIG. 11 illustrates a structure of the matching part 5. The matching part 5 includes an element comparison part 21, an evaluation value calculation part 22, and a total evaluation value calculation part 23. The matching part 5 refers to standard conceptual structures 24, element weighting information 25, and item weighting information 26. The element weighting information 25 represents a degree of influence (or a level of importance) of the comparison result of each element value affecting the comparison result of the entire character string. The item weighting information 26 represents a degree of influence (or a level of importance) of the comparison result of each item value affecting the comparison result of the entire record. FIG. 12A illustrates an example of the element weighting information 25, and FIG. 12B illustrates an example of the item weighting information 26. The standard conceptual structure 24 is the same as or similar to the standard conceptual structure 17 consulted by the conceptual structure generating part 4.

The element comparison part 21 and the evaluation value calculation part 22 serve as a conceptual evaluation function for comparing conceptual structures generated by the conceptual structure generating part 4 for the character string of each item to carry out evaluation. The conceptual evaluation function may exist in accordance with the semantic domain of the item (that is, in accordance with the structures of a compared pair of the name-identification source conceptual structure 10A and the name-identification target conceptual structure 10B). The relationship between a conceptual evaluation function and an item whose conceptual structure is subjected to the comparison may be defined in the name-identification process definition 9 illustrated in FIG. 2.

The element comparison part 21 consults the standard conceptual structure 17 in accordance with the semantic domain of each item, and specifies corresponding elements between the name-identification source conceptual structure 10A and the name-identification target conceptual structure 10B generated for each item to compare the conceptual codes of the specified elements. In other words, the comparison is done at a semantic level by specifying the elements having substantially the same relevancy and the same semantic attribute between the name-identification source conceptual structure 10A and the name-identification target conceptual structure 10B and comparing the conceptual codes of the specified elements with substantially the same relevancy and the same semantic attribute.

The evaluation value calculation part 22 determines a comparison value 27 representing the comparison result (for example, "1" if matching and "0" if mismatch), then weights the comparison value 27 element by element based upon the element weighting information 25, and sums up the comparison values 27 of all the elements in the character string of the processed item to output an evaluation value 28. The weighting process is carried out by multiplying the comparison value 27 of each element by a weighting factor of the weighting information 25. The evaluation value calculation part 22 calculates the evaluation value 28 by applying corresponding matching information and a conceptual evaluation function to each item subjected to the conceptual-structure-based comparison.

The total evaluation value calculation part 23 weights the evaluation value 28 based upon the item weighting information 26, and sums up the evaluation values 28 of all the evaluated items among those items contained in the record to output a total evaluation value 11.

Next, the name-identification process executed by the name identification apparatus 1 is explained using flowcharts.

FIG. 13 is a flowchart illustrating the overall process executed by the name identification apparatus 1. This process is executed on the assumption that the name-identification source data 2A and the name-identification target data 2B, as well as items to be compared and an evaluation function (which includes in this example a conceptual evaluation function for comparison using a conceptual structure, a corresponding analytical grammar 16, a standard conceptual structure 17 and a normalization rule 18), have been specified and that the operation environment including parameter setting such as a determination threshold value has been set up. In this example, the name-identification source data 2A includes multiple name-identification source records, and the name-identification target data 2B includes multiple name-identification target records. Each of the name-identification source records is compared to the name-identification target records.

In step 1 (denoted as "S1" in the figure, which applies to the other steps), the conceptual structure generating part 4 performs a conceptual structure generation process on the character string of each item of a name-identification target record in the name-identification target data 2B, each item being evaluated by a conceptual evaluation function, and generates a name-identification target conceptual structure 10B. The particulars of the conceptual structure generation process are described below.

In step 2, the conceptual structure generating part 4 determines if there are any name-identification target records left unprocessed. If there is an unprocessed name-identification target record left (Yes in S2), the process returns to step 1 to carry out the conceptual structure generation process for the next name-identification target item. If all the name-identification target items have been processed (No in S2), the process proceeds to step 3.

The name-identification target conceptual structures 10B generated by the above-described operation are maintained until the name-identification process is completed to prevent repetition of the same process.

In step 3, the conceptual structure generating part 4 successively reads the name-identification source recorded in the name-identification source data 2A one by one.

In step 4, the conceptual structure generating part 4 performs a conceptual structure generation process on the character string of each item in a name-identification source record to be evaluated by the conceptual evaluation function to generate the name-identification source conceptual structure 10A. The generated name-identification source conceptual structure 10A is temporarily held until the process on this name-identification source record is completed.

In step 5, the matching part 5 successively reads one name-identification target record with name-identification target conceptual structure 10B. In the name-identification target conceptual structure 10B, the character string of each item in the name-identification target record to be evaluation by a conceptual evaluation function is conceptually structured.

In step 6, the matching part 5 carries out a matching process between the name-identification source record in step 4 and the name-identification target record read out in step 5 to calculate the total evaluation value 11. The particulars of the matching process are described below.

In step 7, the determination part 6 determines if the name-identification target record and the name-identification source record agree with each other, based upon the total evaluation value 11 and the determination threshold value set in the name-identification process definition 9. Based upon the determination result, the determination part 6 outputs the name-identification result 3. To be more precise, if the determination result is at or above the upper threshold level of the determination threshold value, the determination part 6 determines that the comparison result is matching. If the determination result is between the upper threshold level and the lower threshold level, it is determined that the comparison result is not available (N/A). If the determination result is at or below the lower threshold level, then it is determined that the comparison result is a mismatch. The matching part 5 may separately output a list of the name-identification source records and the name-identification target records whose comparison results are non-available and requiring manual determination.

In step 8, the matching part 5 determines if there are any name-identification target record left unprocessed. If there is an unprocessed name-identification target record (Yes in S8), the process returns to step 5. If all the name-identification target record have been processed (No in S8), the process proceeds to step 9. At this point of time, the name-identification process for one record of the name-identification source is completed, and therefore, the name-identification source conceptual structure 10A generated in step 4 is opened.

In step 9, the conceptual structure generating part 4 determines if there are any name-identification source records left unprocessed. If there is an unprocessed name-identification source record (Yes in S9), the process returns to step 3. If all the name-identification source records have been processed (No in S9), the overall process terminates.

Next, explanation is made of the conceptual structure generation process executed by the conceptual structure generating part 4 (including the morphological analysis part 12, the syntactic parsing part 13 and the normalization part 14).

Figure 14:
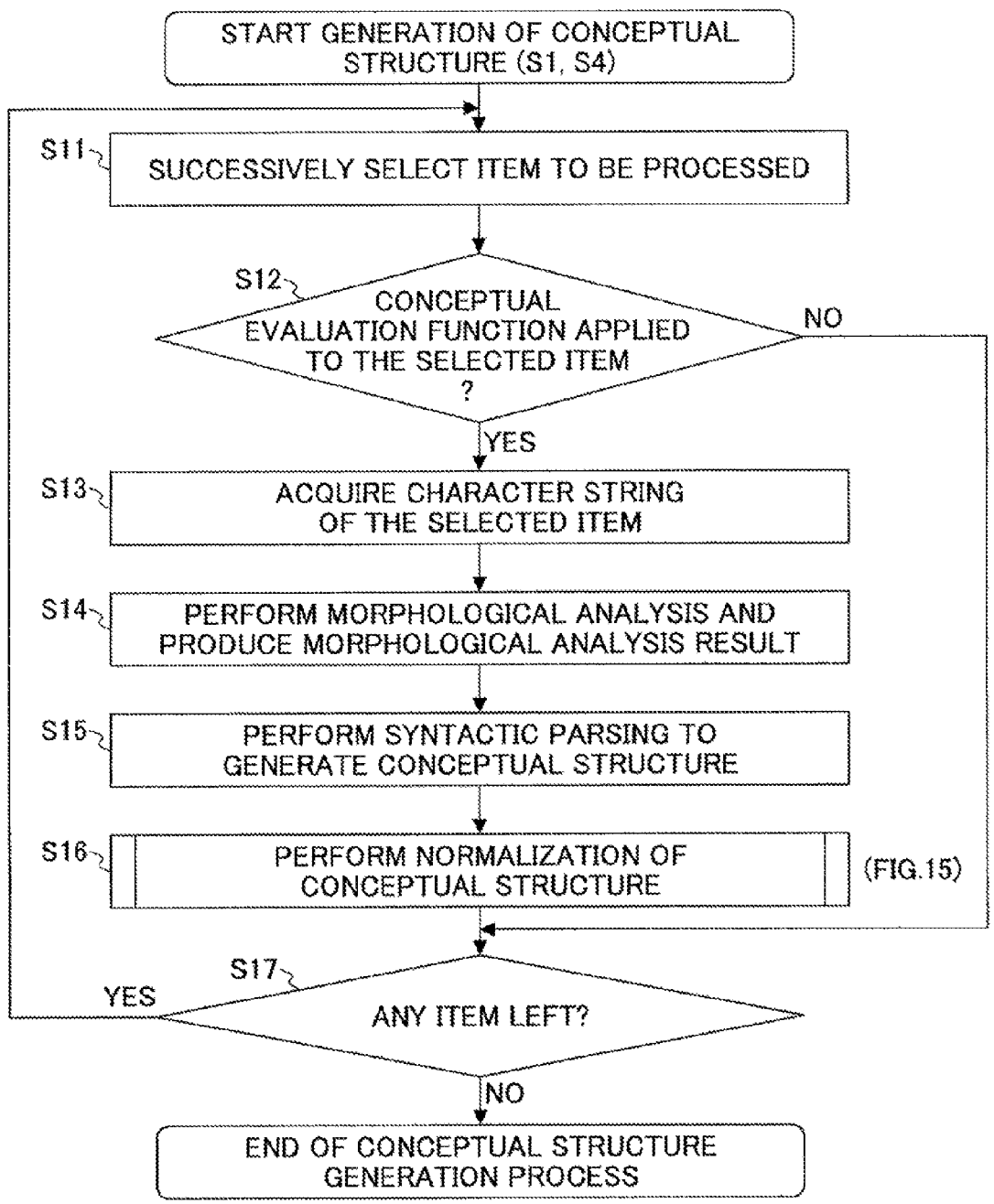
FIG. 14 is a flowchart illustrating a conceptual structure generating process.

FIG. 14 is a flowchart of the conceptual structure generation process.

In step 11, the conceptual structure generation part 4 selects an item to be subjected to the matching process.

In step 12, the conceptual structure generating part 4 determines with reference to the name-identification process definition 9 if the selected item is an item to which a conceptual evaluation function is applied. This determination is whether comparison is to be carried out using a conceptual structure in the matching process of the character strings of the selected item. In other words, the determination is made to determine if a semantic-content-based comparison is performed on the character string of the selected item. If the selected item is one to which a conceptual evaluation function is to be applied (Yes in S12), the process of step 13 is executed. If the selected item is not one to which a conceptual evaluation function is to be applied (No in S12), the process jumps to step 17.

In step 13, the morphological analysis part 12 acquires a character string of an item to be processed.

In step 14, the morphological analysis part 12 splits the character string into individual words from the beginning of the character string with reference to and comparing to the terminology dictionary 15, and outputs the morphological analysis result 19.

In step 15, the syntactic parsing part 13 specifies connection between words, with reference to the analytical grammar 16 corresponding to the semantic domain of the item being processed, based upon the word list which is the morphological analysis result 19 for the character string of this item.

In step 16, the normalization part 14 performs a conceptual structure normalization process. The particulars of the conceptual structure normalization process are described below.

In step 17, the conceptual structure generating part 4 determines if there are any items left unprocessed. If there is an unprocessed item left (Yes in S17), the process returns to step 11. If all the items have been processed (No in S17), the conceptual structure generation process terminates.

Next, explanation is made of the conceptual structure normalization process performed by the normalization part 14.

Figure 15:
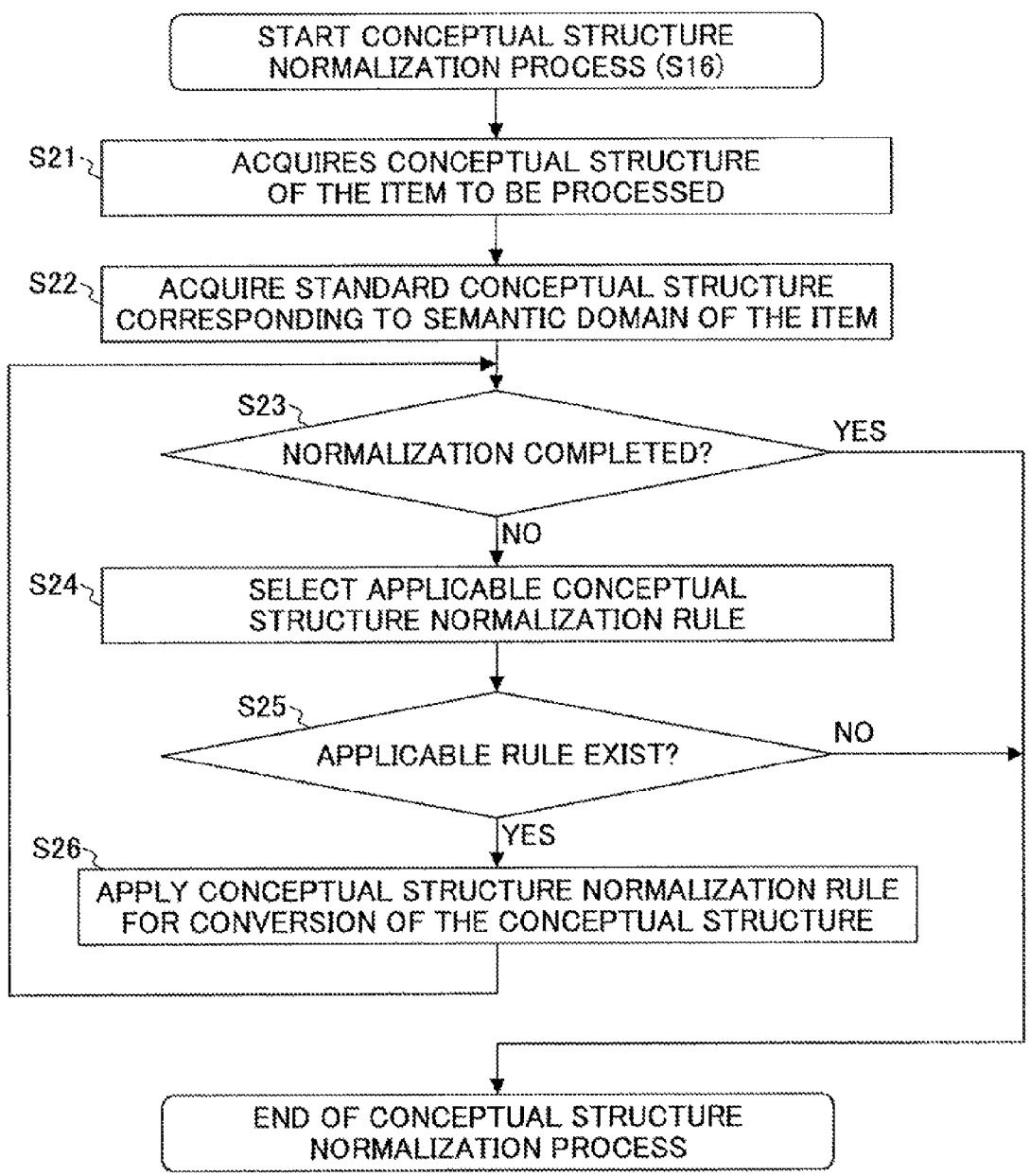
FIG. 15 is a flowchart illustrating a conceptual structure normalization process.

FIG. 15 is a flowchart of the conceptual structure normalization process.

In step 21, the normalization part 14 acquires the conceptual structure of the item being processed.

In step 22, the normalization part 14 acquires the standard conceptual structure 17 corresponding to the semantic domain of the currently processed item from the set of standard conceptual structures 17 stored in the storage device.

In step 23, the normalization part 14 determines if the normalization process has been completed. If the currently processed conceptual structure has become substantially the same structure as the standard conceptual structure 17, it is determined that the normalization process has been completed. If these two structures have not been consistent with each other, it is determined that the normalization process has not been completed. If the normalization process has been completed (Yes in S23), the normalization part 14 terminates the conceptual structure normalization process. If the normalization process has not been completed (No in S23), the process proceeds to step 24.

In step 24, the normalization part 14 selects a rule applicable to the currently processed conceptual structure with reference to the normalization rule 18 corresponding to the acquired standard conceptual structure 17. The normalization part 14 selects a rule whose applicable condition agrees with at least a portion of the structure (or the state) of the currently processed conceptual structure. If there are multiple normalization rules 18 applicable, the normalization part 14 selects the normalization rule 18 that is close to the standard conceptual structure 17 or that hardly meets with the applicable condition in order to avoid repetitive application of the same normalization rule 18.

In step 25, the normalization part 14 determines if an applicable normalization rule 18 is found in the normalization rule selection step 24. If there is an applicable normalization rule 18 (Yes in S25), the process proceeds to step 26. If there is no applicable normalization rule 18 (No in S25), the conceptual structure normalization process is terminated. Alternatively, the normalization part 14 may determine the normalization process unsuccessful if no applicable normalization rule 18 is found (that is, if the currently processed conceptual structure does not match the standard conceptual structure 17), even if the normalization process has not been completed. In this case, if the conversion of the conceptual structure has advanced halfway in the normalization process, the process may return to the previous conceptual structure. Alternatively, the normalization process may be terminated with the halfway converted conceptual structure and the premature ending of the normalization may be reported to the operator of the system.

In step 26, the normalization part 14 converts the conceptual structure by applying the selected normalization rule 18, and the process returns to step 23. In stead of overwriting the data of the conceptual structure, the normalization part 14 may generate and output (or store in the working area) a conceptual structure to which the normalization rule 18 has been applied, separately from the conceptual structure immediately before the normalization rule 18 is applied.

Next, explanation is made of the matching process executed by the matching part 5 (including the element comparison part 21, the evaluation value calculation part 22, and the total evaluation value calculation part 23 that perform the processing of the conceptual evaluation function).

Figure 16:
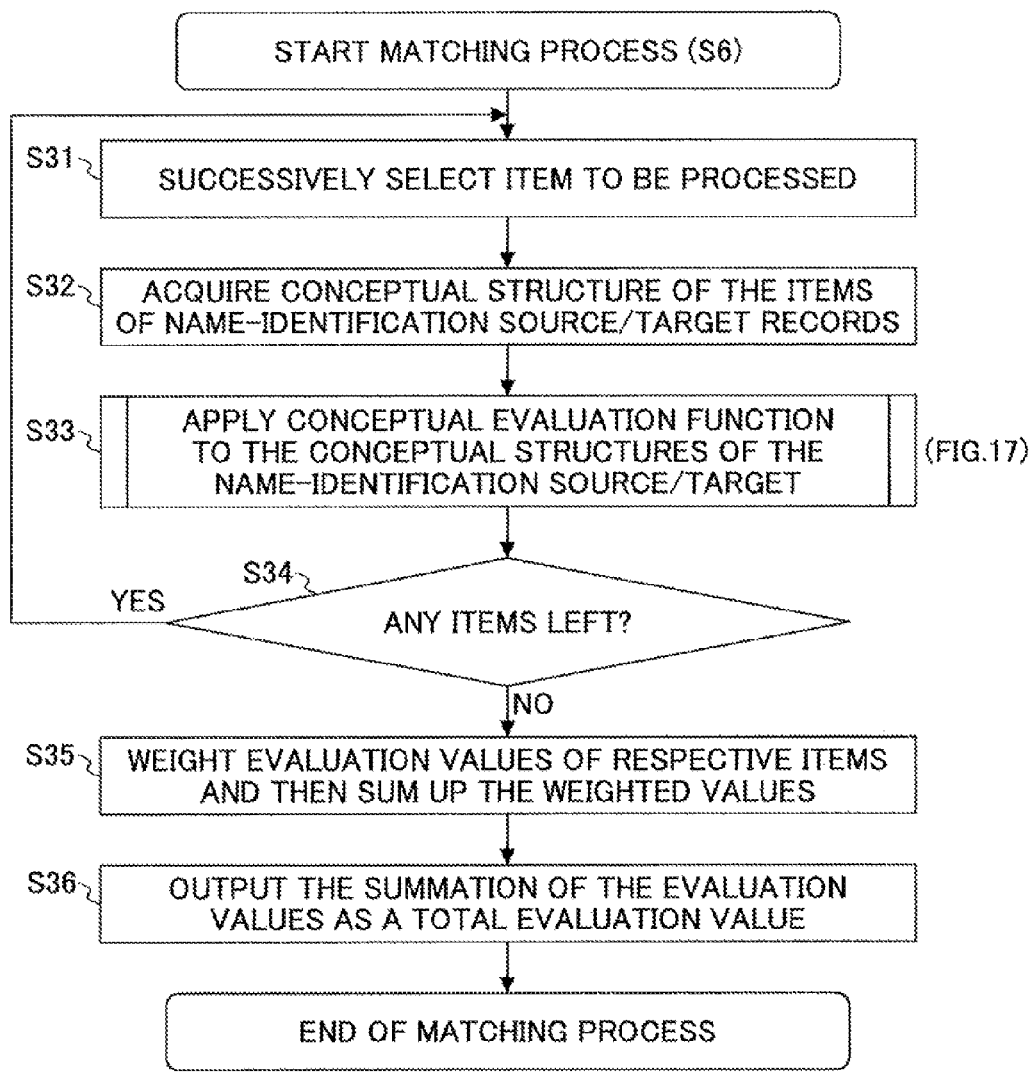
FIG. 16 is a flowchart illustrating a matching process.

FIG. 16 is a flowchart of the matching process.

In step 31, the matching part 5 successively selects an item to be compared between the name-identification target and the name-identification source.

In step 32, the matching part 5 acquires the name-identification source conceptual structure 10A and the name-identification target conceptual structure 10B generated for the character string of the selected item.

In step 33, the element comparison part 21 and the evaluation value calculation part 22 carry out processing of the name-identification source conceptual structure 10A and the name-identification target conceptual structure 10B, applying a conceptual evaluation function, and temporarily hold the evaluation result (i.e., the evaluation value). The processing of the conceptual evaluation function is described in more detail below.

In step 34, the matching part 5 determines if there are any items left unprocessed. If there is an unprocessed item (Yes in S34), the process returns to step 31. If there is no unprocessed item left (No in S34), the process proceeds to step 35.

In step 35, the total evaluation value calculation part 23 weights the evaluation value 28 calculated for each of the processed items based upon the item weighting information 26 stored in the storage device, and sums up the weighted evaluation values 28 to obtain a total evaluation value 11.

In step 36, the total evaluation value calculation part 23 outputs the total evaluation value 11 (or stored in the working area), and the process terminates.

Next, explanation is made of the processing of the conceptual evaluation function.

Figure 17:
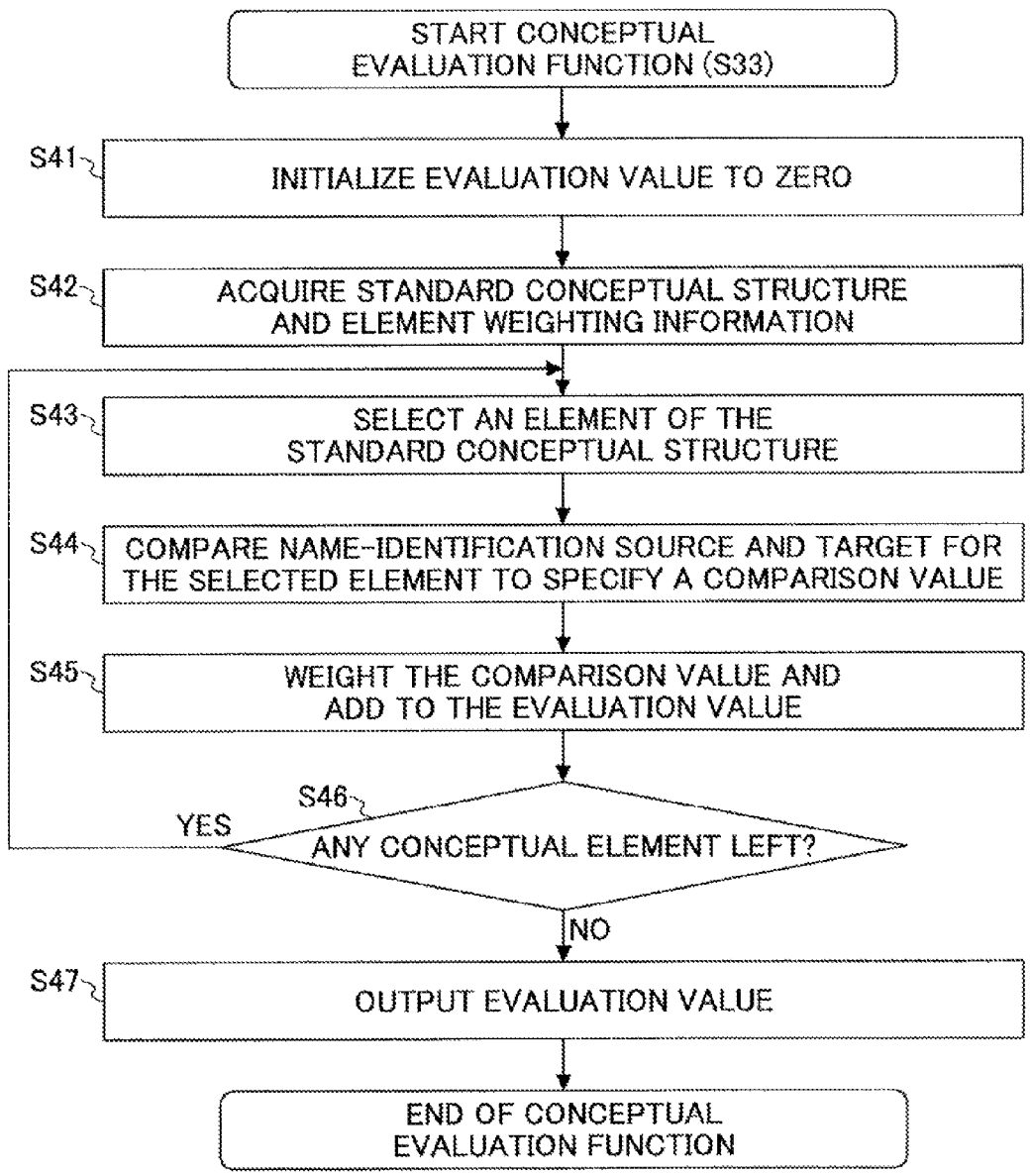
FIG. 17 is a flowchart of processing a conceptual evaluation function.

FIG. 17 is a flowchart of the processing operation of the conceptual evaluation function.

In step 41, the evaluation value calculation part 22 initializes the evaluation value 28 to zero.

In step 42, the element comparison part 21 acquires the standard conceptual structure 17 corresponding to the currently processed item from a set of the standard conceptual structures 17 stored in the storage device. In addition, the evaluation value calculation part 22 acquires an element weighting factor from the element weighting information 25, corresponding to the acquired standard conceptual structure 17.

In step 43, the element comparison part 21 successively selects an element of the standard conceptual structure 17.

In step 44, the element comparison part 21 specifies the conceptual code of the element of the name-identification source conceptual structure 10A and the conceptual code of the element of the name-identification target conceptual structure 10B, which elements correspond to the currently processed element selected in the previous step, to compare the conceptual codes of the elements and determine the comparison value 27 representing the comparison result. The comparison value 27 is, for example, "1" if the conceptual codes under the comparison match, and "0" if mismatched.

In step 45, the evaluation value calculation part 22 acquires a weighting factor for the currently processed item from the element weighting information 25 to weight the comparison value 27, and adds the weighted value to the evaluation value 28.

In step 46, the element comparison part 21 determines whether there are any elements left unprocessed. If there is an unprocessed element (Yes in S46), the process returns to step 43. If there is no unprocessed element left (No in S46), the process proceeds to step 47.

In step 47, the evaluation value calculation part 22 outputs (or stores in the working area) the calculated evaluation value 28, and the conceptual evaluation function process terminates.

An actual example executed in the name identification apparatus 1 is now explained.

In the example described below, it is assumed that there is one name-identification source record and one name-identification target record, and that both of the records include "ID", "FULL_NAME", "ADDRESS" and "OFFICE".

First, the conceptual structure generation process is explained using the character string of the item of "OFFICE" by way of example. The character strings of the "OFFICE" of the name-identification source record and the name-identification target record are presented below.

Name-identification Source:
"Fujitsu Limited, Middleware Division, Data Management and Middleware Department, Second Development Group, Shin-Yokohama Building"

Name-identification Target:
"FUJITSU SY DMM)3 DEVELOPMENT"

It is also assumed in this example that the terminology dictionary 15 illustrated in FIG. 15, the analytical grammar 16 illustrated in FIG. 6, the standard conceptual structure 17 illustrated in FIG. 8, and the normalization rule 18 illustrated in FIG. 10 are used.

In the conceptual structure generating part 4, the following operations are performed. Namely, the morphological analysis part 12 acquires a character string of the "OFFICE" item of the name-identification target record, and generates a morphological analysis result 19 of this character string, which is divided into individual words as illustrated in FIG. 5 (step 14 of FIG. 14), with reference to the terminology dictionary 15 illustrated in FIG. 4.

In addition, the syntactic parsing part 13 converts the morphological analysis result 19 generated from the character string of the "OFFICE" item of the name-identification target record into a conceptual structure, with reference to the analytical grammar 16 illustrated in FIG. 6 (step 15 of FIG. 14). The conversion is carried out according to the following procedure.

(1) According to analytical grammar <1>, a word "Fujitsu" having a semantic attribute [COMPANY NAME] is selected as the main axis node <COMMON>.

(2) According to analytical grammar <3>, the word "Fujitsu" having a semantic attribute [COMPANY NAME] and the word "SY" having a semantic attribute [BUILDING NAME] are associated with each other via the concept <BUSINESS OFFICE>.

(3) According to analytical grammar <5>, the word ")" having a semantic attribute [SEPARATOR] is absorbed in the word "DMM" having a semantic attribute [ORGANIZATION NAME].

(4) According to analytical grammar <4>, the word "Fujitsu" having a semantic attribute [COMPANY NAME] and the word "DMM" having a semantic attribute [ORGANIZATION NAME] are associated with each other via the concept <BUSINESS SEGMENT>.

(5) According to analytical grammar <6>, the word "3" having a semantic attribute [digit] is absorbed in the word "Development" having a semantic attribute of [ORGANIZATION NAME] into a single element, and the single element is converted to the conceptual code "3Develop".

(6) According to analytical grammar <4>, the word "Fujitsu" having a semantic attribute [COMPANY NAME] and the word "Development" having a semantic attribute [ORGANIZATION NAME] are associated with each other via the concept <BUSINESS SEGMENT>.

(7) The conversion to a conceptual structure has been completed for all the words, and the process terminates because there are no more applicable rules.

As a result of the above-described process, the character string of the item "OFFICE" in the name-identification target record is converted to a conceptual structure illustrated in FIG. 7A and FIG. 7B.

Then, the normalization part 14 performs a conceptual structure normalization process on the conceptual structure (step 16 of FIG. 14). The normalization part 14 acquires a conceptual structure illustrated in FIG. 7A, as well as the standard conceptual structure 17 of the "company" domain illustrated in FIG. 8A which corresponds to the item "OFFICE" (step 21 and step 22 of FIG. 15). The normalization part 14 makes a comparison between the conceptual structure generated by the conceptual structure generating part 4 (see FIG. 7A and FIG. 7B) and the standard conceptual structure 17 (see FIG. 8A and FIG. 8B) to determine if the normalization process has been completed (step 23: the first round). In this example, the To-node of the conceptual structure <2> of FIG. 7A ([FUJITSU $COMPANY NAME]-<BUSINESS OFFICE>-[SY_Buil $BUILDING NAME]) is different from the To-node of the standard conceptual structure <2> of FIG. 8A ([FUJITSU $COMPANY NAME]-<BUSINESS OFFICE>-[$BUSINESS OFFICE NAME]), namely, the semantic attributes of the element are different between [$BUILDING NAME] and [$BUSINESS OFFICE NAME]. Accordingly, for this mismatched portion, an applicable rule is selected from the normalization rule 18 illustrated in FIG. 10 (step 24: the first round). In this example, normalization rule <1> is selected as a rule applicable to the conceptual structure <2>. Under the application of the normalization rule <1>, the conceptual structure illustrated in FIG. 7A and FIG. 7B is converted to the conceptual structure illustrated in FIG. 18A and FIG. 18B (step 25 and step 26: the first round) by changing the semantic attribute of the To-node of the conceptual structure <2> from [$BUILDING NAME] to [$BUSINESS OFFICE NAME].

The normalization part 14 further makes a comparison between the conceptual structure of FIG. 18A and the standard conceptual structure of FIG. 8A to determine if the normalization has been completed (step 23: the second round). In this example, the From-node of the conceptual structure <4> of FIG. 18A ([FUJITSU $COMPANY NAME]-<BUSINESS SEGMENT>-[3Develop $GROUP]) is different from the From-node of the standard conceptual structure <4> of FIG. 8A ([$DEPARTMENT]-<BUSINESS OFFICE>-[$GROUP]), namely, the semantic attributes of the element is different between [$COMPANY NAME] and [$DEPARTMENT]. Accordingly, for this different portion, an applicable rule is selected from the normalization rule 18 illustrated in FIG. 10 (step 24: the second round).

Focusing on the normalization rule <2>, the first condition [*]-<BUSINESS SEGMENT>-[$DEPARTMENT] will agree with the conceptual structure <3> if the From-node [*] is set to [FUJITSU $COMPANY NAME] and if the To-node [$DEPARTMENT] is set to [DMM $DEPARTMENT]. The second condition [*]-<BUSINESS SEGMENT>-[$GROUP] agrees with the conceptual structure <4> because the From-node [*] is [FUJITSU $COMPANY NAME] as in the first condition. This means that the currently processed conceptual structure satisfies the applicable condition of the normalization rule <2>. Accordingly, the normalization rule <2> is selected to convert the conceptual structure of FIG. 18A (step 25 and step 26: second round). As a result, the From-node of the conceptual structure <4> is changed to [DMM $DEPARTMENT] which agrees with [$DEPARTMENT] of the first condition. Thus, the conceptual structure becomes one illustrated in FIG. 19A and FIG. 19B.

Figures 19A, 19B:
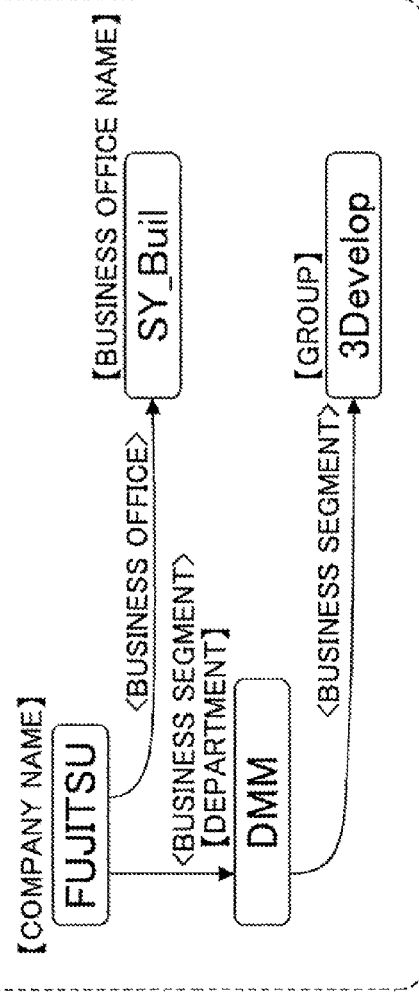
FIG. 19A is an explanatory diagram of a name-identification target conceptual structure (upon completion of normalization)
FIG. 19B is a schematic diagram of the normalized name-identification target conceptual structure of FIG. 19A.

Again, the normalization part 14 makes a comparison between the conceptual structure of FIG. 19A and the standard conceptual structure of FIG. 8A to determine if the normalization has been completed (step 23: the third round). At this stage, the entirety of the conceptual structure agrees between the conceptual structure of FIG. 19A and the standard conceptual structure of FIG. 8A, and therefore, the conceptual structure of FIG. 19A is fixed as the name-identification target conceptual structure 10B, and the conceptual structure normalization process terminates.

Figures 20A, 20B:
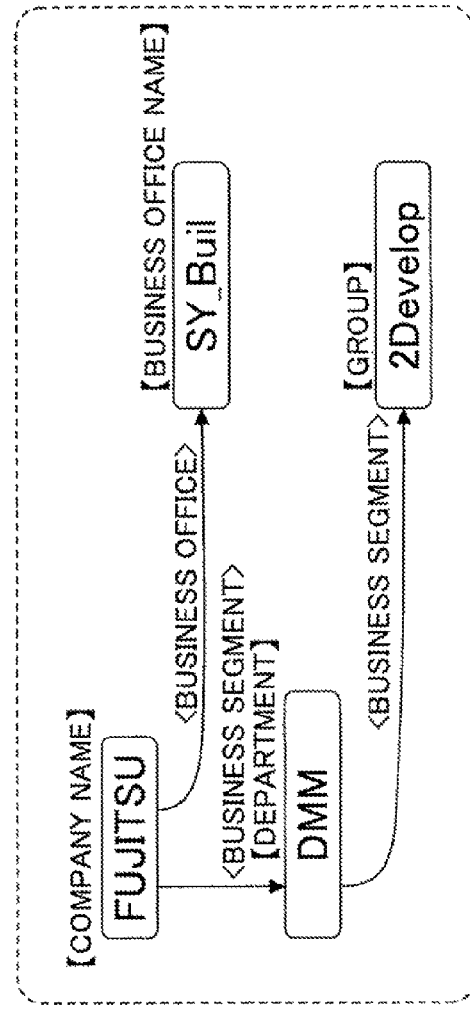
FIG. 20A is an explanatory diagram of a name-identification source conceptual structure (upon completion of normalization)
FIG. 20B is a schematized diagram of the normalized name-identification source conceptual structure of FIG. 20A.

The conceptual structure generating part 4 also performs the conceptual structure generating process on the character string of the "OFFICE" item in the name-identification source record. As a result of the process, a name-identification source conceptual structure 10A illustrated in FIG. 20A and FIG. 20B is generated for the character string of the "OFFICE" item of the name identification source record.

Next, explanation is made of the matching process, especially of the comparison of the conceptual structure generated for the "OFFICE" item. The matching part 5 selects the item "OFFICE" for the current processing, and acquires the name-identification source conceptual structure 10A and the name-identification target conceptual structure 10B (step 31 and step 32 of FIG. 16). The element comparison part 21 that serves as a conceptual evaluation function compares the conceptual codes of the corresponding elements between the name-identification source conceptual structure 10A and the name-identification target conceptual structure 10B to calculate the evaluation value 28 of the "OFFICE" item (step 33 of FIG. 16).

To be more precise, the evaluation value calculation part 22 initializes the evaluation value 28 to zero (step 41 of FIG. 17). Then, the element comparison part 21 sets the evaluation value of the element to "1.0" if the corresponding elements between the name-identification source conceptual structure 10A and the name-identification target conceptual structure 10B agree with each other, and sets the value to "0" if they do not agree with each other. Then, the evaluation value is weighted based upon the application of the element weighting information 25 and added to the evaluation value 28 (steps 42-45). For example, the element [COMPANY NAME] of the name-identification source conceptual structure 10A of FIG. 20A and the element [COMPANY NAME] of the name-identification target conceptual structure 10B of FIG. 19A are compared to each other. These elements are consistent with each other at [FUJITSU]. The weighting factor of element [COMPANY NAME] is 0.6 (see FIG. 12A). Accordingly, the evaluation value of element [COMPANY NAME] becomes 1.0×0.6=0.6. Similarly, element [DEPARTMENT] and element [BUSINESS OFFICE NAME] are also consistent between the source and target conceptual structures 10A and 10B. The evaluation value of element [COMPANY NAME] becomes 1.0×0.2=0.2. The evaluation value of element [BUSINESS OFFICE NAME] becomes 1.0×0.1=0.1. On the other hand, elements [GROUP] are not substantially the same between the name-identification source and the name-identification target, and accordingly, the evaluation value becomes 0×0.1=0. The evaluation value calculation part 22 sums up the evaluation values of the respective elements (0.6+0.2+0.1+0=0.9) and outputs the calculation result as the evaluation value 28 (step 46 and step 47). FIG. 21 illustrates in a table the relationships among element weighting factor, element comparison value 27, weighted comparison value, and evaluation value 28, in association with each element.

The conceptual structure generating part 4 generates and normalizes a conceptual structure for items "FULL_NAME" and "ADDRESS", respectively, in addition to item "OFFICE". The matching part 5 calculates an evaluation value 28 for each of the items. The matching part 5 applies a weighting factor to each of the respective evaluation values 28, as illustrated in FIG. 12B, and sums up the weighted evaluation values to output the total evaluation value 11. For example, It is assumed that the character string of item "FULL_NAME" matches semantically, that the character string of item "ADDRESS" matches semantically, and that the evaluation values 28 of the respective items are "FULL_NAME"=1, "ADDRESS"=1 and "OFFICE"=0.9. When the evaluation values of the respective items are weighted based upon the item weighting information illustrated in FIG. 12B, the value of item "FULL_NAME" becomes 1×0.5=0.5, the value of item "ADDRESS"

becomes 1×0.3=0.3, the value of item "OFFICE" becomes 0.9×0.2=0.18, and the total evaluation value 11 becomes 0.5+0.3+0.18=0.98. The upper limit of the threshold value defined in the name-identification process definition 9 illustrated in FIG. 2 is 0.72, and the lower limit of the threshold value is 0.26. The total evaluation value 11 exceeds the upper limit of the threshold value. Accordingly, the determination part 6 determines that the name-identification source record and the name-identification target record agree with each other, and outputs the determination result as a name-identification result 3 (step 7 of FIG. 13).

With this name-identification process, for the character strings of items to be compared between the name-identification source record and the name-identification target record, comparison is made between conceptual codes of corresponding elements in conceptual structures generated for the respective character strings, rather than simple comparison between notations of the character strings. The conceptual structure under the comparison is normalized in accordance with a standard conceptual structure given as a semantic structure that compared items are expected to have in common. In this normalization process, each of the conceptual structures under the comparison is modified as to the semantic attribute of each element and connection between elements, while maintaining the entire meaning unchanged, and converted into a structure according to the standard conceptual structure. Consequently, the name-identification source conceptual structure 10A and the name-identification target conceptual structure 10B can specify corresponding elements conforming to the standard conceptual structure. Corresponding elements are elements that have semantically a commonality, in other words, elements that are compared essentially. For example, elements [GROUP] in FIG. 19A and FIG. 20A have a common meaning of "a group which is a business segment of a department of a company". By comparing these two elements, strict comparison can be made as to the "group which is a business segment of a department of a company". A conceptual code is a code for identifying a general idea of a word in the real world. By comparing the conceptual codes of the corresponding elements using conceptual structures, an actual difference can be evaluated in the strict comparison between the elements having a semantic commonality. For example, comparing the conceptual code[2Develop] of [GROUP] in FIG. 20A and the conceptual code[3Develop] of [GROUP] in FIG. 19A is synonymous with comparison between "the second Development Group" and "the third Development Group" as to a business group having substantially the same semantic concept, although the notations of the character strings are different from each other. Accordingly, in view of the general idea of the real world that "the groups are different", but "the groups are close", and a substantial comparison result can be obtained.

According to the comparison based upon the conceptual evaluation function using a conceptual structure, a determination explained below can be made, unlike the conventional comparison between the notations of the character strings (such as a comparison as to a full match, a partial match or a left-hand match of the notations of the character strings, or a comparison based on a evaluation function using N-gram or an edit distance). That is, even if the notations of the character strings under the comparison are different, a comparison result exhibiting a match is generated as long as the general ideas in the real world agree with each other between the compared words which are elements forming a common structure.

With the comparison process using a conceptual structure, two character strings can be determined as a match when using words with different notations but with substantially the same semantic content, using words having the same notations but with different orders of notations, or using words having substantially the same semantic content but with different notations and different orders of notations. In the above-described example, a comparison is made using conceptual structures between the character string of item "OFFICE" of the name-identification source and the character string of item "OFFICE" of the name-identification target, and a comparison result that the two character strings agree with each other. If the notations of these two character strings are simply compared, the comparison result will become a mismatch. Furthermore, it is difficult for the conventional comparison means (such as full match, partial match, left-hand match, N-gram, edit distance, etc.) to determine that these character strings are close to each other.

Thus, the comparison process using the conceptual structure can achieve character string comparison close to manual comparison and determination made by a person, unlike a simple comparison between the notations of character strings.

In the above-described embodiment, an evaluation value is calculated by weighting each of the comparison values of the conceptual codes of the respective elements according to the importance levels of the elements. Depending on the setting of the weighting values for the elements, the degree of influence of the comparison result of each pair of elements affecting the comparison result of the entire character string can be adjusted. If such adjustment is not required, the evaluation value may be calculated without performing the element weighting process. Similarly, when calculating a total evaluation value, the total evaluation value is calculated after the item-weighting process is carried out according to the importance levels of the respective items. Depending on the setting of the weighting values for the items, the degree of influence of the comparison result of each pair of items compared by means of the evaluation function affecting on the comparison result between records can be adjusted. If such adjustment is not required, the total evaluation value may be calculated without performing the item weighting process.

In the above-described embodiment, in the name-identification process illustrated in FIG. 13, the name-identification target conceptual structures 10B are generated for the character strings of all the name-identification target records (steps 1 and 2). Accordingly, comparison between a name-identification source record and a name-identification target record can be made in the subsequent process using the name-identification target conceptual structures 10B. It is unnecessary to generate a name-identification target conceptual structure every time the name-identification source record is to be processed changes.

The comparison using conceptual codes of corresponding elements of conceptual structures is applicable not only to the name-identification of the first embodiment, but to any comparison between character strings. As long as a terminology dictionary, analytic grammar, a standard conceptual structure and a normalization rule are stored in a storage device in advance in accordance to the contents (domains) of two character strings to be compared, normalized conceptual structures are generated for the character strings by the conceptual structure generating process and the normalization process. By the matching process, conceptual codes of corresponding elements of the two conceptual structures are compared to calculate an evaluation value. If the comparison result between two character strings is determined using evaluation values of the character strings, calculation of the total evaluation value 11 by summing up the evaluation values of the character strings of multiple items and the determination process using a threshold are not required.

In the above-described embodiment, after the conceptual structure is generated by the syntactic parsing part 13, the conceptual structure is normalized by the normalization part 14 during the conceptual structure generating process. However, the normalization process may be omitted if the conceptual structure generated by the syntactic parsing part 13 agrees with the standard conceptual structure. In other words, if the terminology dictionary or the analytic grammar is selected such that the syntactic parsing part can generate a conceptual structure similar to the standard conceptual structure, the normalization process is not required any longer.

Generation of a conceptual structure is not always necessary. For example, conceptual structure for the character strings to be compared may be generated and stored in a storage device in advance. In this case, the conceptual structures corresponding to the character strings under the comparison are acquired from the storage device for the comparison. This arrangement does not require generating a conceptual structure every time character strings are compared, and processing workload can be reduced.

In the above-described embodiment, comparison is made using conceptual structures. However, conceptual structures may not be used as long as comparison can be made between conceptual codes having a common semantic attribute. For example, based upon the semantic attributes of words belonging to the morphological analysis results of one character string and another character string to be compared, a word pair with a common semantic attribute may be specified to compare the conceptual codes of the specified words.

If comparison is made using conceptual structures normalized in accordance to the standard conceptual structure according to an item (an overall character string), the following process can be performed. If in the normalization process a character string whose conceptual structure cannot be brought into agreement with the standard conceptual structure (i.e., if the normalization process cannot be completely applied), unlike the embodiment, generation of the conceptual structure may be stopped (or comparison using conceptual structures is avoided) by determining that the character string is not suitable for the semantic-content-based comparison. In this case, perfect matching with the standard conceptual structure can be evaluated between two character strings under the comparison. It is the efficient means for acquiring perfect matching based upon the semantic content.

In the normalization process, if the conceptual structure cannot be brought into agreement with the standard conceptual structure, the process may proceed to the next matching process after the maximum possible processing has been carried out. In the matching process, only those elements matching the standard conceptual structure are compared. With this arrangement, a reasonable comparison result can be obtained even if the character strings under the comparison do not have sufficient information. This arrangement is effective when accepting ambiguity. In the matching process, when one of a comparison pair of elements does not exist, the evaluation value may be set to an intermediate value, such as 0.5, instead of zero, a concept "Assuming that there is information, evaluation is closer rather than different" is introduced.

When comparison is made between conceptual codes of words having a common semantic attribute between one character string and another character string without generating conceptual structures and without performing normalization, it is difficult to make a strict determination for the entirety of a character string based upon the semantic content. However, the method is effective when comparing character strings in which the semantic attributes of words forming the character strings clearly agree with each other, and it is possible to realize a comparison based upon the semantic content of character strings.

Next, explanation is made of a modification in which the matching process for an element is stopped at a point of time when it becomes apparent during the processing of the conceptual evaluation function that the evaluation value calculated by successively adding the comparison values of the respective elements will be less than the threshold value.

Figure 22:
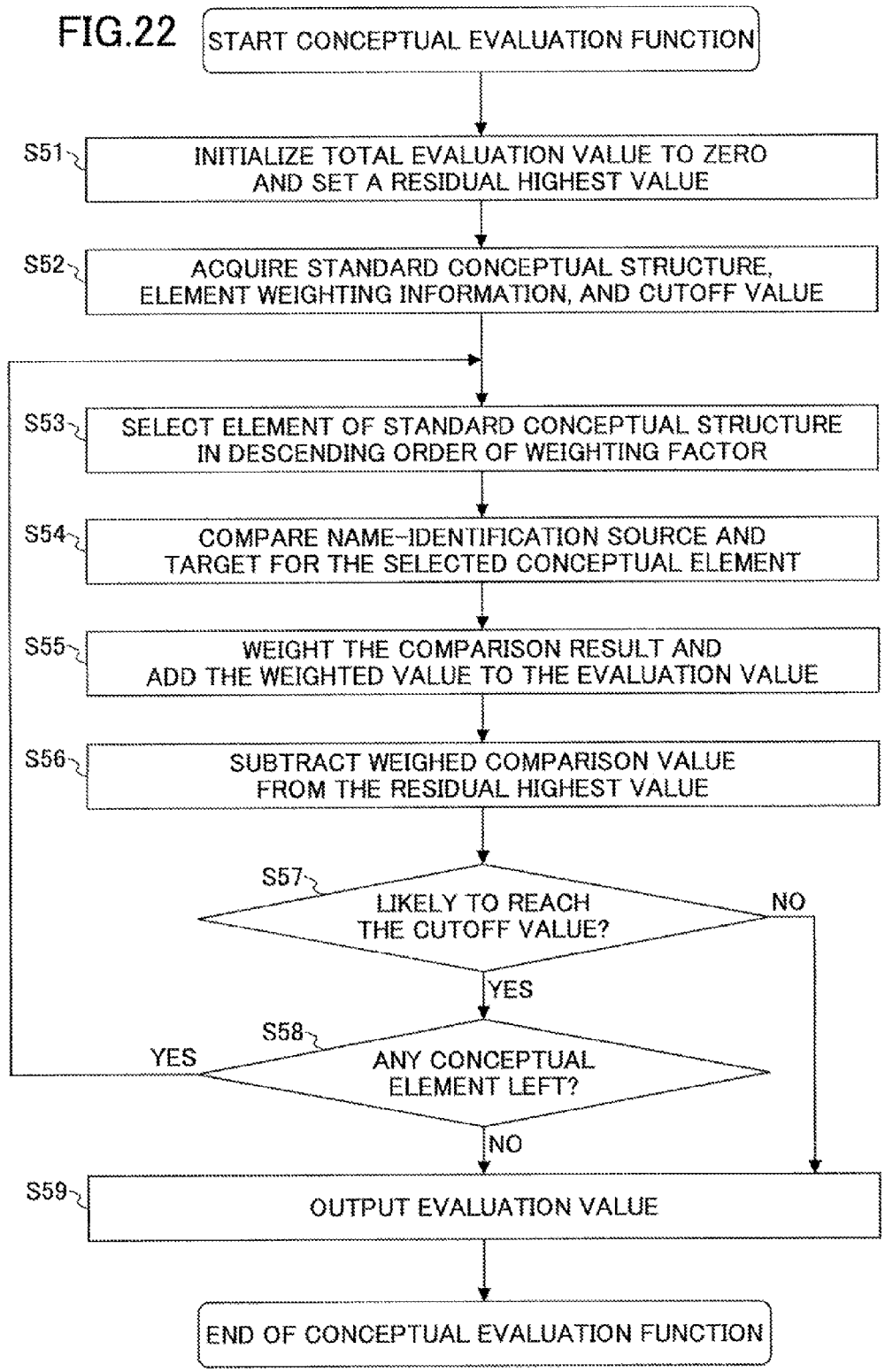
FIG. 22 is a flowchart of application of a conceptual evaluation function.

FIG. 22 is a flowchart illustrating an example of processing of the conceptual evaluation function executed by the matching part 5.

In step 51, the evaluation value calculation part 22 initializes the evaluation value to zero. The evaluation value calculation part 22 selects a maximum possible value (e.g., "1") that the evaluation value could take for the currently processed item as a residual highest value.

In step 52, the element comparison part 21 acquires a standard conceptual structure corresponding to the currently processed item from a set of standard conceptual structures stored in the storage device. The evaluation value calculation part 22 acquires an element weighting value corresponding to the standard conceptual structure and a cutoff value which becomes a determination criterion as to whether the processing of the conceptual evaluation function for the currently processed item be stopped.

In step 53, the element comparison part 21 selects an element in the standard conceptual structure in the descending order starting from the element with the greatest weight. By starting from the element with the greatest weight, the cutoff determination can be performed at the earliest stage to efficiently reduce the processing quantity. Of course, elements may be selected in a different order.

In step 54, the element comparison part 21 compares the name-identification source conceptual structure 10A and the name-identification target conceptual structure 10B for the selected element to identify a determination value representing the comparison result. The determination value is, for example, "1" when elements agree with each other and "0" when disagree.

In step 55, the evaluation value calculation part 22 weights the determination value identified in step 54 using a corresponding weighting value and adds the weighted value to the evaluation value.

In step 56, the evaluation value calculation part 22 subtracts a value obtained by weighting a determination value indicative of matching of the element (i.e., the maximum determination value for the element) from the residual highest value.

In step 57, the evaluation value calculation part 22 determines whether the sum of the present-stage evaluation value and the residual highest value is greater than the cutoff value. This determination is, in other words, a determination whether there is a possibility that the evaluation value becomes greater than the cutoff value assuming that all the determination values for the remaining elements are the maxim values, and a determination whether the process be stopped at this stage. If the summed value is likely to be greater than the cutoff value (Yes in S57), the process proceeds to step 58. The summed value is not likely to reach the cutoff value (No in S57), the process proceeds to step 59.

In step S58, the element comparison part 21 determines whether there are any unprocessed elements. If there is an unprocessed element (Yes in S58), the process returns to step 53. If there is no unprocessed element left (No in S58), the process proceeds to step 59.

In step 59, the evaluation value calculation part 22 outputs (or stores in the working area) the evaluation value and terminates the processing of the conceptual evaluation function.

According to this modification, the processing of the conceptual evaluation function is stopped when it becomes apparent in the middle of the calculation of the evaluation value that the evaluation value does not reach the cutoff value. In this case, the evaluation value obtained at that point of time by summing up the comparison values of the processed elements is output. This modification is effective in the above-described name-identification process when an item to be subjected to the character-string comparison is only one. If there is only one item for which comparison of the character string comparison is carried out, the evaluation value calculated for this item becomes the total evaluation value. Accordingly, the fact remains that the evaluation value is less than the lower limit of the determination threshold value in the comparison between the total evaluation value and the threshold value even if the calculation of the evaluation value (i.e., the sum of the comparison values of the respective elements) is stopped. The comparison result is not influenced regardless whether or not the process of the conceptual evaluation function is stopped in the middle. Accordingly, an unneeded process is eliminated and the processing workload of the CPU can be reduced.

The process of the conceptual evaluation function of this modification is also applicable to an arbitrary character-string comparison process, other than a name-identification process.

[b] Second Embodiment

Since the semantic-content-based comparison of character strings of each item is applicable not only to name-identification, but also to any comparison processes, the second embodiment provides a database retrieval (search), in which a character string that becomes a search condition (referred to as a search string) is compared with a value string of an item of the search target of a record stored in the database.

Figure 23:
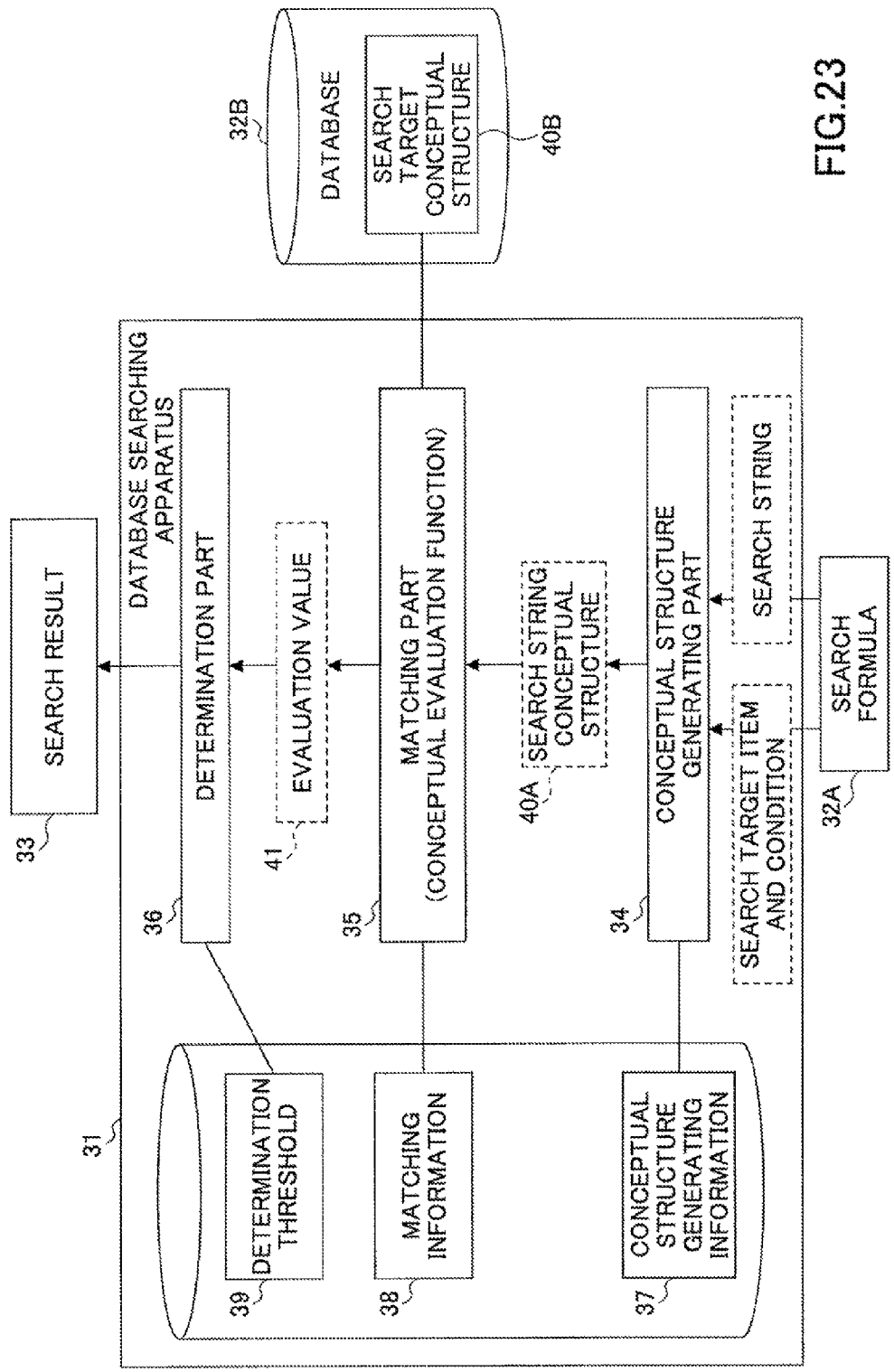
FIG. 23 illustrates an overall structure of a system for realizing database retrieval.

FIG. 23 illustrates an overall structure of a system for realizing a database search process. In this system, a database searching apparatus 31 matches a search string, which is a value of a search condition for the item of the search target designated by a search formula 32A, to a value string of the target item contained in the record stored in the database 32B according to the search condition. The database searching apparatus 31 identifies a record having a character string of a target item that agrees with the search string (matching the search condition) at a semantic-content level, and outputs a search result 33.

The database searching apparatus 31 has a conceptual structure generating part 34, a matching part 35 and a determination part 36, which parts structure a mechanism for carrying out the database search process. The database searching apparatus 31 also has conceptual structure generating information 37, matching information 38, and determination threshold information 39 stored in a storage device such as a hard disk drive. The conceptual structure generating part 34, the matching part 35, the determination part 36, the conceptual structure generating information 37 and the matching information 38 are, as a general rule, substantially the same as the conceptual structure generating part 4, the matching part 5, the determination part 6, the conceptual structure generating information 7 and the matching information 8 of the name identification apparatus 1, expect for the fact that the a search string and a character string of a database item are compared. In the database search process, a search condition is designated in the search formula 32A as to whether string comparison is made using a conceptual structure. Accordingly, in place of the name-identification process definition 9 used in the name identification process, determination threshold information 39 is stored in the storage device, which information is used for determination as to whether the search string agrees with the character string of a database item. Determination threshold values may be dynamically designated by the search formula 32A. The database searching apparatus 31 has a search string which is a value of a search condition, together with a target search item and a search condition acquired as an interpretation result of the search formula 32A. Since the interpretation of the search formula 32A is a conventional technique realized by a SQL parser in a database, explanation for it is omitted here. The database searching apparatus 31 also has a search string conceptual structure 40A generated for the search string, and an evaluation value 41 representing a comparison result between the search string and the character string of an item of a record in the database 32B. In the description below, explanation is made of the database searching apparatus 31 focusing mainly on the differences from the name identification apparatus 1.

In the database searching apparatus 31, search target conceptual structure 40B is generated in advance by a system operator or the like for the character string of each item of a record having a possibility of becoming a semantic-content-based search target of the database 32B, and stored in the database 32B. The search target conceptual structure 40B may be stored as a database item value or an index. Appropriate maintenance is performed on the set of search target conceptual structures 40B as appropriate.

Upon designation of the search formula 32A, the search formula 32A is interpreted using a conventional technique and broken down into a search target item (and condition) and a search string. If a semantic-content-based string comparison is designated as a search condition, the conceptual structure generating part 34 carries out a conceptual structure generation process and conceptual structure normalization process for the search string. In this context, a name-identification source record of the first embodiment is read as a search string, and a name-identification source conceptual structure of the first embodiment is read as the search string conceptual structure 40A. In addition, the search target conceptual structure 40B of the second embodiment, which is a record item value in the database 32B of the search target, corresponds to the name-identification target conceptual structure of the first embodiment. The search target conceptual structure 40B is generated in advance from a character string (which is an item value) by a process equivalent to the process of the conceptual structure generating part and stored in the database 32B. Accordingly, it is unnecessary to perform a conceptual structure generating process when performing the search process on a search target.

The matching part 35 compares the search string conceptual structure 40A generated for the designated search string, to the search target conceptual structure 40B stored in the target database as a record item value or an index relating to the search string. This comparison is made on the element-by-element basis using a conceptual evaluation function, and an evaluation value 41 is output. In the second embodiment, determination is made by the determination part 56 according to the search condition based upon the comparison result between the search string and the character string of one item included in a record. Accordingly, it is unnecessary to sum up the comparison results of the respective items for each record. It is unnecessary to calculate a total evaluation value. The evaluation value 41 corresponds to the total evaluation value of the first embodiment.

The determination part 36 compares the evaluation value 41 to the determination threshold value 39 depending on the search condition to determine whether the search string agrees with (or conforms to) the item value of the database, and outputs the search result 33 based upon the determination result.

If multiple search conditions are designated in the search formulae 32A, a determination process that corresponds to calculation of the total evaluation value of the first embodiment may be carried out during the determination based upon the multiple search conditions.

The targeted character string is not necessarily taken out of the database 32B for the processing in the database searching apparatus 31, and other implementation may be available as long as such implementation is logically equivalent to the execution of the database searching apparatus 1. To be more precise, a database searching device may be installed in the database 32B as a part of the database management system (DBMS). The matching process of the matching part 35 and the determination process of the determination part 36 may be performed during a process of searching a record or the corresponding index in the database 32B through determination whether the value of a searched target item designated by the search formula 32A satisfies the search condition, and only a search result 33 that satisfies the search formula 32A may be output.

Figure 24:
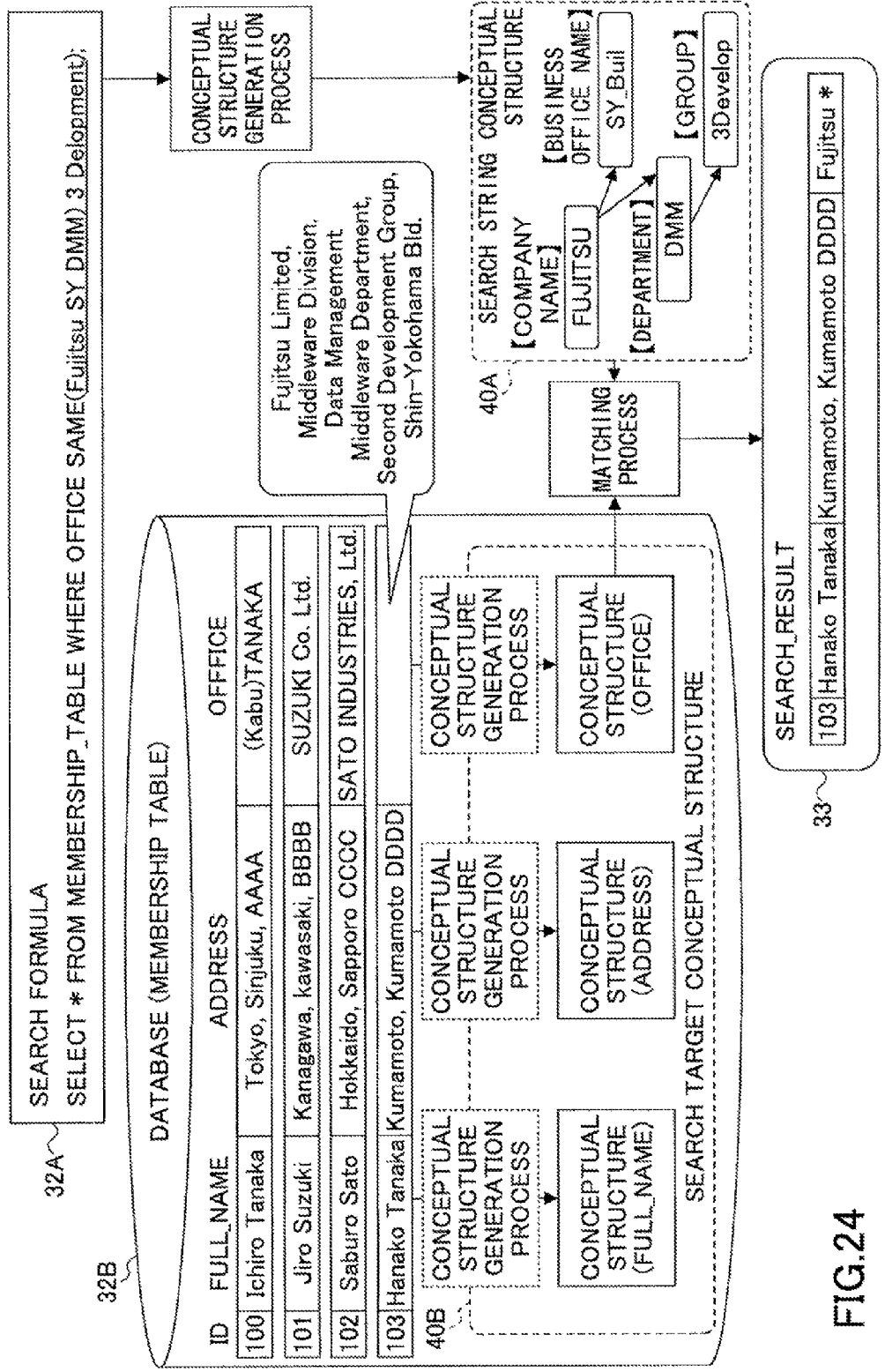
FIG. 24 is an explanatory diagram of database retrieval.

FIG. 24 illustrates an actual example of the database searching process. In this example, a search formula 32A to be executed is "SELECT*FROM MEMBERSHIP_TABLE WHERE OFFICE SAME (Fujitsu SY DMM)3 Development". The "SAME" function in this formula is a function for performing similarity searching on a character string through semantic-content-based comparison using a predetermined threshold value. The search formula 32A designates a search condition to extract a record having a character string of the "OFFICE" item whose semantic content is similar to that of the search string "Fujitsu SY DMM) 3development", from the "MEMBERSHIP_TABLE" of the database 32B. This search formula 32A is interpreted that the search target item is "OFFICE", the search string is "Fujitsu SY DMM)3Development", and the search condition is "SAME( )". In the database 32B, search target conceptual structures 40B are stored in advance for the respective items, corresponding to the item values. For example, for the "OFFICE" item of record ID "103", a search target conceptual structure 40B that structures a value string "Fujitsu Limited, Middleware Division, Data Management Middleware Department, Second Development Group, Shin-Yokohama Building" into a conceptual structure based upon the standard conceptual structure of the "company name" domain. It is presumed that the conceptual structure generating information 37 and the matching information 38 are substantially the same as the conceptual structure generating information 7 and the matching information 8 of the first embodiment.

Similar to the first embodiment, a search string conceptual structure 40A is generated, which is a conceptual structure of the search string "Fujitsu SY DMM)3 Development" produced based upon the standard conceptual structure of the "company name" domain corresponding to the "OFFICE" item of the search target. The search string conceptual structure 40A and the search target conceptual structure 40B in the database 32B are compared with each other. As a result, the evaluation value 41 becomes 0.9 as in the first embodiment. If the determination threshold 39 has an upper limit of 0.72 and a lower limit of 0.26 as in the determination threshold defined in the name-identification process definition 9, the evaluation value 41 exceeds the upper limit of the determination threshold. Accordingly, the determination part 36 determines that the search string is similar to the character string of the "OFFICE" item of the record of ID "103" (that is, the record of ID "103" matches the search), and outputs the search result 33.

In this manner, the character string comparison based upon the semantic content of the string is applied to database search. If the search string and the character string of the database item of the search target are different in notation, but agree with each other in the semantic content, a record containing the character string of this item is extracted as a search result.

In the second embodiment, conceptual structures are stored in advance in the database for the character strings of search target items to reduce the processing amount used for the search. However, a conceptual structure may be generated for a character string of a search target item when performing a database search.

[c] Third Embodiment

In the third embodiment, a character string comparison process based upon the semantic content of the string is applied to an XML retrieval.

In the third embodiment, an "element" of XML is referred to as a "XML element" and an "attribute" of XML is referred to as an "XML attribute" to distinguish them from the "element" of the grammatical "attribute" and the semantic "attribute".

Figure 25:
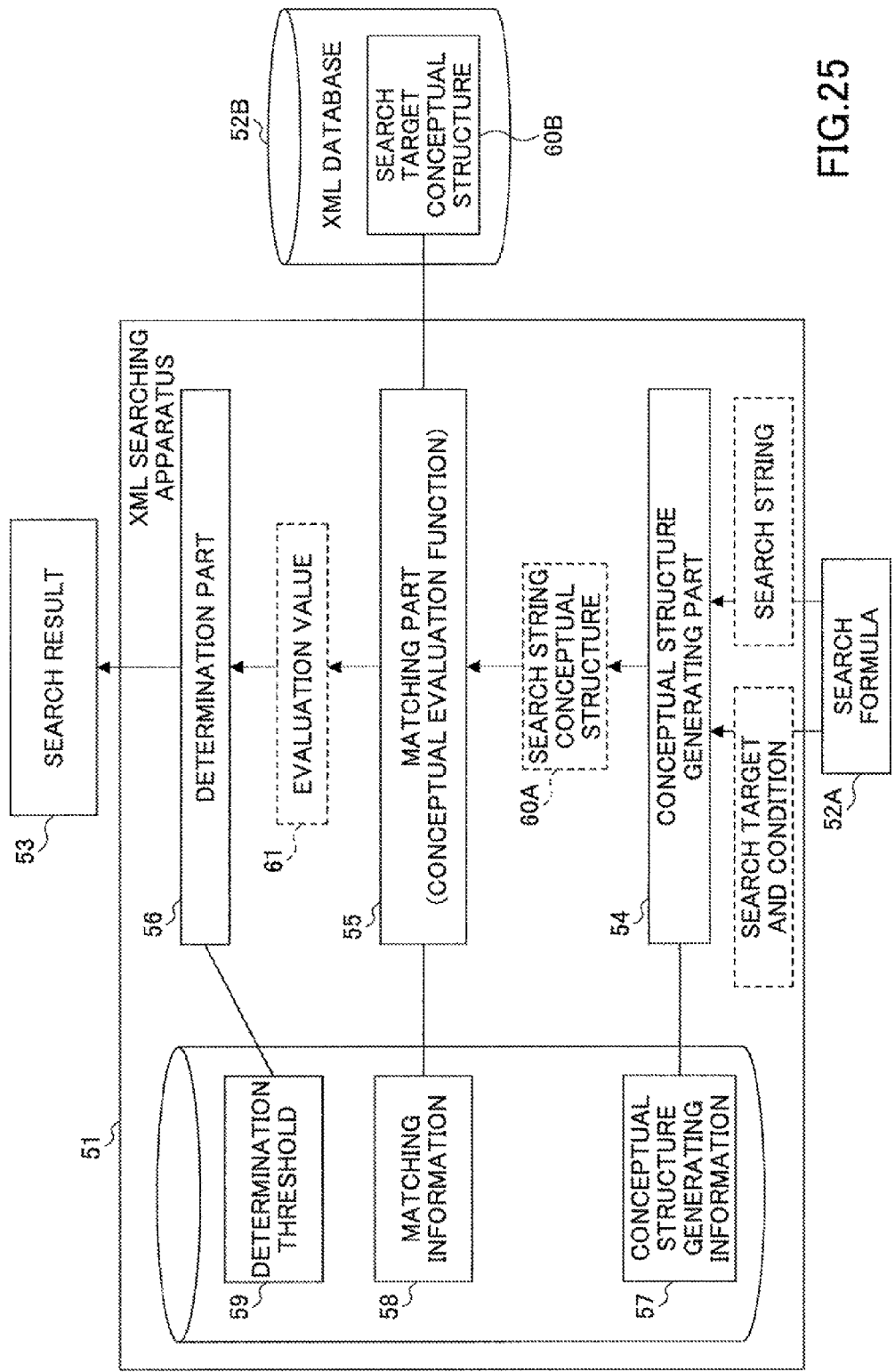
FIG. 25 illustrates an overall structure of a system for realizing XML retrieval.

FIG. 25 illustrates an overall structure of a system for realizing XML retrieval. In this system, an XML searching apparatus 51 matches a search string, which is a value of a search condition for an XML element or an XML attribute designated as a searched object by a search formula 52A, to a character string in the XML database 52B, which character string is a value of the XML element (or the XML attribute) of a data item of the search target in the XML database 52B. The XML searching apparatus 51 identifies an XML data item (element) having a character string with an XML element or an XML attribute whose semantic content agrees with the search string (matching the search condition), and outputs a search result 53.

The XML searching apparatus 51 has a conceptual structure generating part 54, a matching part 55 and a determination part 56, which parts structure a mechanism for carrying out the XML search process. The XML searching apparatus 51 also has conceptual structure generating information 57, matching information 58, and determination threshold information 59 stored in a storage device such as a hard disk drive. The conceptual structure generating part 54, the matching part 55, the determination part 56, the conceptual structure generating information 57 and the matching information 58 are, as a general rule, substantially the same as the conceptual structure generating part 4, the matching part 5, the determination part 6, the conceptual structure generating information 7 and the matching information 8 of the name identification apparatus 1, except for the fact that the a search string and a character string of an XML which is a value of an XML element or an XML attribute. In the XML search process, determination threshold information 59 is stored in the storage device as in the second embodiment. The determination threshold information 59 is used for determination as to whether the search string agrees with the character string of an XML as a search target expressed as a value of an XML element or an XML attribute. Determination threshold values may be dynamically designated by the search formula 52A. The XML searching apparatus 51 has a search string which is a value of a search condition, together with a search target XML element (or XML attribute) and a search condition acquired as an interpretation result of the search formula 52A. Since the interpretation of the search formula 52A is a conventional technique realized by an XQuery parser in a database, explanation for it is omitted here. The XML searching apparatus 51 also has a search string conceptual structure 60A generated for the search string, and an evaluation value 61 representing a comparison result between the search string and an XML character string which is a value of the XML element or the XML attribute in the XML database 52B. In the description below, explanation is made of the XML searching apparatus 51 focusing mainly on the differences from the name identification apparatus 1.

In the XML searching apparatus 51, a search target conceptual structure 60B is generated in advance by a system operator or the like for the character string which is a value of an XML element or an XML attribute having a possibility of becoming a semantic-content-based search target of the XML database 52B, and stored in the XML database 32B as in the second embodiment. The search target conceptual structure 60B may be stored as an XML element value or an XML attribute value, or alternatively, it may be stored as an index. Appropriate maintenance is performed on the set of search target conceptual structures 60B as appropriate.

Upon designation of a search formula 52A, the search formula 52A is interpreted using a conventional technique and broken down into a search condition and search target (XML element or XML attribute), and a search string. If a semantic-content-based string comparison is designated as a search condition, the conceptual structure generating part 54 carries out a conceptual structure generation process and conceptual structure normalization process for the search string. In this context, a name-identification source record of the first embodiment is read as a search string, and a name-identification source conceptual structure of the first embodiment is read as the search string conceptual structure 60A. In addition, the search target conceptual structure 60B of the character string of an XML element or an XML attribute of a search target contained in the XML database 52B of the third embodiment corresponds to the name-identification target conceptual structure of the first embodiment. The search target conceptual structure 60B is generated in advance from a character string (which is an XML element value or an XML attribute value) by a process equivalent to the process of the conceptual structure generating part and stored in the database 52B. Accordingly, it is unnecessary to perform a conceptual structure generating process when performing the search process on a search target.

The matching part 55 compares the search string conceptual structure 60A generated for the search string with the search target conceptual structure 60B of the XML element or the XML attribute stored as an XML element value or an XML attribute value (or an index) as a search target in the database. This comparison is made on the element-by-element basis using a conceptual evaluation function, and an evaluation value 61 is output. In the third embodiment, the evaluation value 61 corresponds to the total evaluation value of the first embodiment, as in the second embodiment.

The determination part 56 compares the evaluation value 61 with the determination threshold value 59 depending on the search condition to determine whether the search string agrees with (or conforms to) the value of the XML element or the XML attribute of the XML database search target, and outputs the search result 53 based upon the determination result.

If multiple search conditions are designated in the search formulae 52A, a determination process that corresponds to calculation of the total evaluation value of the first embodiment may be carried out during the determination based upon the multiple search conditions.

The targeted character string (which is an XML element value or an XML attribute value) is not necessarily taken out of the database 52B for the processing in the XML searching apparatus 51, and another implementation may be available as long as such implementation is logically equivalent to the execution of the database searching apparatus 1. To be more precise, an XML searching device may be installed in the database 32B as a part of the XML database system. The matching process of the matching part 55 and the determination process of the determination part 56 may be performed during a process of searching for an XML element or an XML attribute, or the corresponding index in the XML database 52B through determination whether the XML element value or the XML attribute value of the search target designated by the search formula 52A satisfies the search condition, and only a search result 53 that satisfies the search formula 52A may be output.

Figure 26:
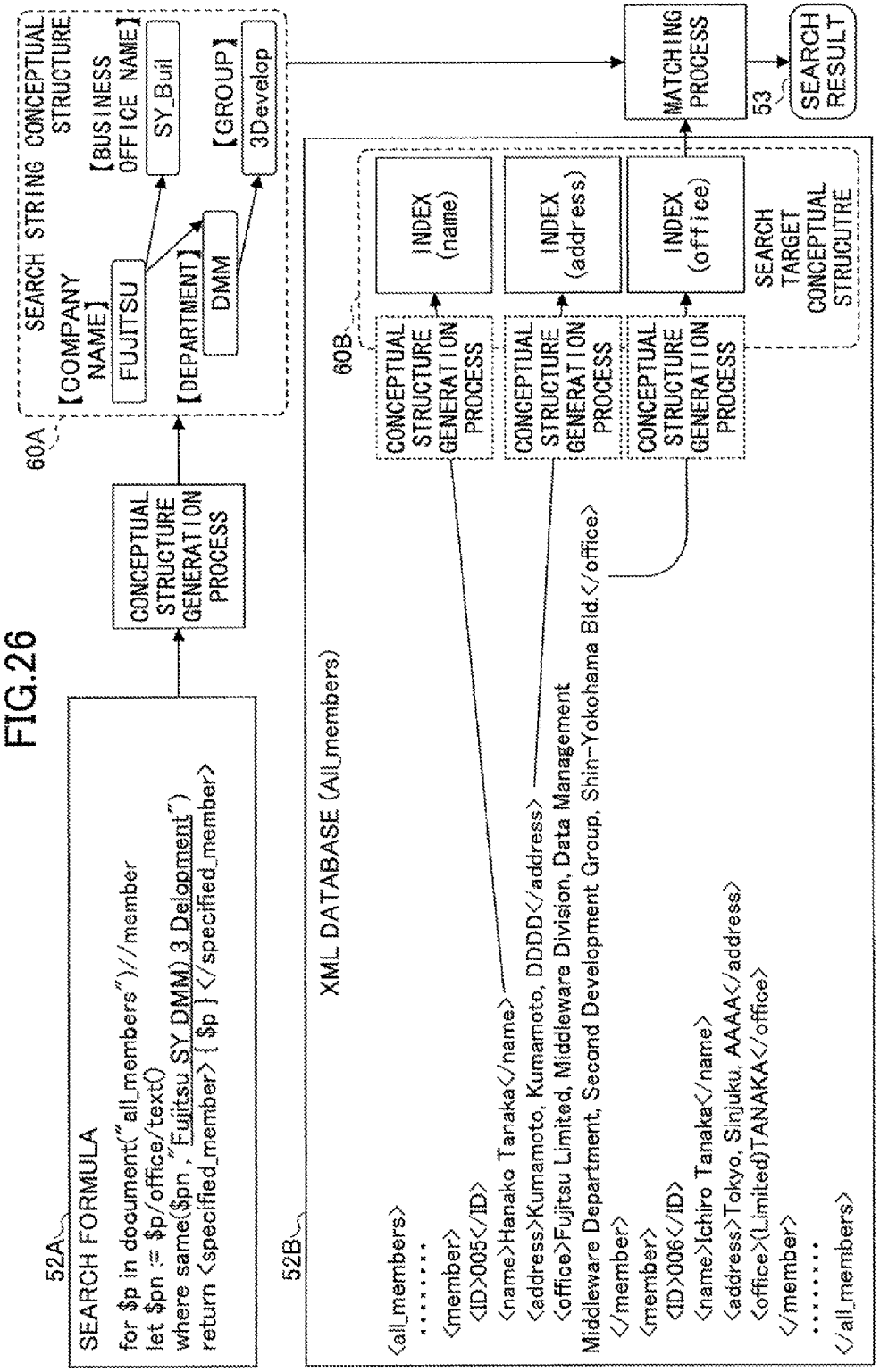
FIG. 26 is an explanatory diagram of XML retrieval.

FIG. 26 illustrates an actual example of the XML searching process. In this example, a search formula (XQuery FLWR expression formula) 52A to be executed is "for $p in document ("all_members")//member let $pn:=$p/office/text( ) where same ($pn, "Fujitsu SY DMM)3 Development") return <specific_member>{$p}</specific_member>". The "same" function in this formula is a function for performing similarity searching on a character string through semantic-content-based comparison using a predetermined threshold value, as in the second embodiment. This search formula 52A designates a search condition to extract, as an XML element "specific_member", an XML element "member" having an XML subelement "office" whose value string (text) is semantically matching with "Fujitsu SY DMM)3 Development" from the XML "all_members" contained in the XML database 52B. This search formula 52A is interpreted so that the XML element of the search target is "office" which is a subelement of the XML element "member", the search string is "Fujitsu SY DMM)3 Development", and the search condition is "same( )". In the XML database 52B, a search target conceptual structure 60B is stored. The search target conceptual structure 60B is generated by conceptually structuring the character string "Fujitsu Limited, Middleware Division, Data Management Middleware Department, Second Development Group, Shin-Yokohama Bld.", which is a value string of the XML element "office" as a subelement of XML element "member" having a subelement ID "005", based upon the standard conceptual structure of the "company name" domain corresponding to the XML element "office". It is presumed that the conceptual structure generating information 57 and the matching information 58 are substantially the same as the conceptual structure generating information 7 and the matching information 8 of the first embodiment.

Similar to the first embodiment, a search string conceptual structure 60A is compared to the above-descried search target conceptual structure 60B. The search string conceptual structure 60A is generated from the search string "Fujitsu SY DMM)3 Development" based upon the standard conceptual structure of the "company name" domain corresponding to the XML element "office". As a result of the comparison, the determination part 56 determines that the search string is similar to the value string of the XML element "office", which is a subelement of "member" having a subelement ID "005". Thus, the XML element "member" having a subelement of ID "005" matches the search formula 52A, and this XML element "member" is output as a search result 53 of the XML element of "specific_member".

In this manner, the character string comparison based upon the semantic content of the string is applied to XML retrieval. If the search string and the value string of the XML element or XML attribute of the search target in the XML database are different in notation, but agree with each other in the semantic content, an XML element data item containing a character string of the matched element is extracted as a search result.

In the third embodiment, instead of storing in advance conceptual structures of the value strings of XML element or XML attribute of an XML search target in the XML database 52B, a conceptual structure may be generated for a value string of an XML element or an XML attribute of a search target when performing XML retrieval.

<Hardware Structure>

The functional structure and the physical structure of the above-described name identification apparatus 1 are not limited to the example illustrated in FIG. 1. The respective functions and the physical resources may be unified when implemented, or alternatively, they may be dispersed in implementation. The same applies to the database searching apparatus 31 of the second embodiment and the XML searching apparatus 51 of the third embodiment. The functions of the name identification apparatus 1, the data searching apparatus 31 and the XML searching apparatus 51 may be realized by executing a program by a CPU (central processing unit) of a computer, or implemented by logic circuits or a FPGA (field programmable gate array). A hardware structure of a computer is explained below using the name identification apparatus 1 of the first embodiment as an example.

FIG. 27 illustrates an example of a computer that executes a name-identification program. The computer has an input device 71, a CPU 72, a RAM (random access memory) 73, a HDD (hard disk drive) 74 and a display device 75.

The input device 71 receives various types of inputs, for example, an execution command of the name-identification process from a system administrator. The hardware of the input device 71 includes, for example, a keyboard, a mouse, a touch panel, and a microphone.

The CPU 72 loads a name-identification program 76 from the HDD 74 in the RAM 73 and executes the name-identification program 77. The CPU carries out a name-identification processing process 78. The functions (or processes) realized by the name-identification processing process 78 include the overall process, the conceptual structure generation process, the conceptual structure normalization process, the matching process, and the conceptual evaluation function.

The RAM 73 has a name-identification program 76 loaded by the CPU 72 from the HDD 74, and stores processing data 81 used by the CPU 72 to execute the name-identification processing program 77. The processing data 81 include, for example, a morphological analysis result 19, a pre-normalization conceptual structure 20, a name-identification source conceptual structure 10A, a name-identification target conceptual structure 10B, a comparison value 27, an evaluation value 28, and a total evaluation value 11.

In the HDD 74 are stored a name-identification processing program 76, input data 79, and various types of data 80. The various types of data 80 include, for example, conceptual structure generating information 7, matching information 8 and the name-identification process definition 9.

The display device 75 has a display screen to display a name identification result 3.

The name-identification processing program 76 is not necessarily stored in the HDD 74, and it may be stored in an arbitrary computer-readable, non-transitory recording medium (such as a CD, a DVD, or a flash memory). The name-identification processing program 76 may be stored in memory means of other computers connected to the above-described computer via a network. The input data 79 and the various data 80 may also be stored in memory means of other computers connected to the above-described computer via a network.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiments of the present inventions have been described in detail, it should be understood that the various changes, substitutions, and alterations could be made hereto without departing from the spirit and scope of the invention.

What is claimed is:

1. A computer-readable, non-transitory recording medium storing therein a program which, when executed by a computer, causes the computer to perform a process comprising:
   splitting a first character string and a second character string into words;
   acquiring information including a semantic attribute that represents a semantic nature of each of the words and a conceptual code that semantically identifies said each of the words, from a storage device;
   generating a first conceptual structure based upon the semantic attribute of each of the words included in the first character string and a grammatical configuration;
   generating a second conceptual structure based upon the semantic attribute of each of the words included in the second character string and the grammatical configuration; and
   generating a comparison result between the first character string and the second character string based upon a comparison result between the first conceptual structure and the second conceptual structure.

2. The computer-readable, non-transitory recording medium according to claim 1, wherein the process further includes:
   acquiring a first conceptual structure that has a first conceptual code as a first element corresponding to a first word in the first character string, the first element being associated based upon the semantic attribute or a location of the first word, and a second conceptual structure having a second conceptual code as a second element corresponding to a second word in the second character string, the second element being associated based upon the semantic attribute or a location of the second word; and comparing the first conceptual code and the second conceptual code of corresponding elements between the first conceptual structure and the second conceptual structure, the first conceptual structure and the second conceptual structure being set up in common according to a semantic domain that a whole length of the first character string and a whole length of the second character string have in common.

3. The computer-readable, non-transitory recording medium according to claim 1, wherein the process further includes:

determining a comparison value representing the comparison result of the conceptual codes for each of multiple conceptual code pairs between the first character string and the second character string; and calculating an evaluation value by summing the comparison values of the multiple conceptual code pairs, and wherein the generation of the comparison result includes generating the comparison result between the first character string and the second character string by comparing the evaluation value and a determination threshold value.

4. The computer-readable, non-transitory recording medium according to claim 3, wherein the comparing the conceptual code includes:

weighting each of the comparison values according to the semantic attribute or the location of the corresponding conceptual code; and summing up the weighted comparison values to calculate the evaluation value.

5. The computer-readable, non-transitory recording medium according to claim 1, wherein the process is a name-identification process for matching a name-identification source data item and a name-identification target data item.

6. The computer-readable, non-transitory recording medium according to claim 1, wherein the process is a database searching process searching in a database for records stored therein using a search string to extract a record having a data item that matches the search string from the XML database.

7. The computer-readable, non-transitory recording medium according to claim 1, wherein the process is an XML searching process searching in an XML database using a search string to extract a data item that matches the search string from the XML database.

8. A computer comprising:

a central processing unit to execute a procedure, the procedure comprising:

splitting a first character string and a second character string into words;

acquiring information including a semantic attribute that represents a semantic nature of each of the words and a conceptual code that semantically identifies said each of the words, from a storage device;

generating a first conceptual structure based upon the semantic attribute of each of the words included in the first character string and a grammatical configuration;

generating a second conceptual structure based upon the semantic attribute of each of the words included in the second character string and the grammatical configuration; and generating a comparison result between the first character string and the second character string based upon a comparison result between the first conceptual structure and the second conceptual structure.

9. A method comprising:

splitting, by a central processing unit (CPU), a first character string and a second character string into words;

acquiring, from a storage device by the CPU, information including a semantic attribute that represents a semantic nature of each of the words and a conceptual code that semantically identifies said each of the words, from a storage device;

generating, by the CPU, a first conceptual structure based upon the semantic attribute of each of the words included in the first character string and a grammatical configuration;

generating, by the CPU, a second conceptual structure based upon the semantic attribute of each of the words included in the second character string and the grammatical configuration; and generating, by the CPU, a comparison result between the first character string and the second character string based upon a comparison result between the first conceptual structure and the second conceptual structure.

* * * * *